US006788302B1

(12) United States Patent
Ditlow et al.

(10) Patent No.: US 6,788,302 B1
(45) Date of Patent: Sep. 7, 2004

(54) PARTITIONING AND LOAD BALANCING GRAPHICAL SHAPE DATA FOR PARALLEL APPLICATIONS

(75) Inventors: Gary S. Ditlow, Garrison, NY (US); Daria R. Dooling, Huntington, VT (US); David E. Moran, South Burlington, VT (US); Ralph J. Williams, Essex Junction, VT (US)

(73) Assignee: International Business Machines Corporation, Armonk, NY (US)

(*) Notice: Subject to any disclaimer, the term of this patent is extended or adjusted under 35 U.S.C. 154(b) by 464 days.

(21) Appl. No.: 09/631,764

(22) Filed: Aug. 3, 2000

(51) Int. Cl.[7] ............................................... G06F 15/80
(52) U.S. Cl. ...................... 345/505; 345/544; 718/105
(58) Field of Search ................................ 345/501–506, 345/507, 519–520, 522, 530–574, 629, 639, 640; 718/100, 102, 104, 105

(56) References Cited

U.S. PATENT DOCUMENTS

| | | | |
|---|---|---|---|
| 4,866,637 A | | 9/1989 | Gonzalez-Lopez et al. |
| 5,530,457 A | | 6/1996 | Helgeson |
| 5,587,922 A | | 12/1996 | Hendrickson et al. |
| 5,598,570 A | | 1/1997 | Ho et al. |
| 5,604,848 A | | 2/1997 | Harada et al. |
| 5,999,187 A | * | 12/1999 | Dehmlow et al. .......... 345/420 |
| 6,008,822 A | * | 12/1999 | Yumoto et al. ............. 345/530 |

OTHER PUBLICATIONS

IBVM Technical Disclosure Bulletin, "Techniques for Improving Multi–Partitioning Algorithm", vol. 36, No. 1, Jan. 1993, pp. 473–477.
Journal of Parallel and Distributed Computing, "Prototyping and Simulating Parallel, Distributed Computations", vol. 23, No. 1, Oct. 1994, pp. 1–9.

IBM Technical Disclosure Bulletin, "Placement Optimization Using a Graphical Placement Tool in the VLSI Interactive Design Automation System Database", vo. 38, No. 8, Aug. 1995, pp. 353–354.
Proceedings Eighth SIAM Conference on Parallel Processing for Scientific Computing, "Spreading Metric based Graph Partitioning Algorithms", pp. 8, 1997, Abstract; Proceedings of the High–Performance Computer (HPC '98), "Data Mining on Views in a Parallel Data Server", pp. 133–138, Abstract.
Proceedings of the Eighth Annual ACM–SIAM Symposium on Discrete Algorithms, "Fast Approximate Graph Partitioning Algorithms", pp. 639–648, 1997, Abstract; 3rd International Conference on Algorithms and Architectures of Parallel Processing, "Parallel Algorithms fo Patical Data Partition adn Join Processing,", 1997, pp. 703–716, Abstract.

* cited by examiner

Primary Examiner—Kee M. Tung
(74) Attorney, Agent, or Firm—Schmeiser, Olsen & Watts; Richard M. Kotulak

(57) ABSTRACT

The present invention divides a large graphics file into smaller "frames" of graphics files. The division process is preferably load balanced amongst any number of processors. This allows many processors to be used in parallel to divide the large graphics file and to then process the smaller output frames. Additionally, the load balancing is performed in such a manner that only portions of the graphics file need be loaded by any one processor. This saves memory and computational requirements. Preferably, the graphics file is divided in a three-dimensional manner, such that any one processor will be assigned one three-dimensional block or volume of the graphics file. The three-dimensional partition of the graphics file will become one frame, and the one processor accesses the graphics file to copy its three-dimensional partition into the new output frame.

53 Claims, 15 Drawing Sheets

PROCESSOR 1

PROCESSOR 2

PROCESSOR 3

CELL TABLE EXAMPLE

| Cell 1 | Cell 2 | Cell 3 |
|---|---|---|
| Seek: 462<br>bytes: 21688<br>x: (-1989,29959)<br>y: (-306,25688)<br>trfm: cell,m,a,tx,ty<br>    dx,dy,nx,ny<br>    x(xmin,xmax)<br>    y(ymin,ymax) | Seek: 256<br>bytes: 10778<br>x: (-1989,13400)<br>y: (200,7806)<br>trfm: 3,1,0,0,0<br>    0,0,0,0<br>    (-200,-1636)<br>    (200,2000) | Seek: 606<br>bytes: 1176<br>x: (200,1636)<br>y: (200,2000)<br>trfm: NULL |

FIG. 11

DDmap

| 0 | 0 | 0 | 0 | 0 | 0 | 0 | 9 | 9 | 9 |
|---|---|---|---|---|---|---|---|---|---|
| 0 | 0 | 0 | 0 | 0 | 0 | 0 | 9 | 9 | 9 |
| 0 | 0 | 0 | 0 | 0 | 0 | 0 | 9 | 9 | 9 |
| 9 | 9 | 18 | 18 | 25 | 16 | 16 | 16 | 7 | 7 |
| 9 | 9 | 18 | 18 | 25 | 16 | 16 | 16 | 7 | 7 |
| 16 | 16 | 32 | 32 | 39 | 23 | 23 | 23 | 7 | 7 |
| 7 | 7 | 14 | 14 | 14 | 7 | 7 | 16 | 9 | 9 |
| 7 | 7 | 14 | 14 | 14 | 7 | 7 | 16 | 9 | 9 |
| 7 | 7 | 14 | 14 | 14 | 7 | 7 | 16 | 9 | 9 |
| 7 | 7 | 14 | 14 | 14 | 7 | 7 | 16 | 9 | 9 |

FIG. 12

Owners (vertical partitions)

| 0 | 0 | 0 | 0 | 1 | 1 | 1 | 2 | 2 | 2 |

FIG. 13

Owners (general partitions)

| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 2 | 2 | 2 |
| 0 | 0 | 0 | 0 | 0 | 1 | 2 | 2 | 2 | 2 |
| 0 | 0 | 0 | 0 | 0 | 1 | 2 | 2 | 2 | 2 |
| 0 | 0 | 0 | 0 | 0 | 1 | 2 | 2 | 2 | 2 |
| 1 | 1 | 1 | 1 | 1 | 1 | 2 | 2 | 2 | 2 |
| 1 | 1 | 1 | 1 | 1 | 1 | 2 | 2 | 2 | 2 |
| 1 | 1 | 1 | 1 | 1 | 1 | 2 | 2 | 2 | 2 |
| 1 | 1 | 1 | 1 | 1 | 1 | 2 | 2 | 2 | 2 |

FIG. 14

PARTITIONING AND LOAD BALANCING GRAPHICAL SHAPE DATA FOR PARALLEL APPLICATIONS

BACKGROUND OF THE INVENTION

1. Technical Field

This invention generally relates to graphical shape data. More specifically, this invention relates to partitioning and load balancing graphical shape data for parallel applications.

2. Background Art

When semiconductor chips are created, there are certain patterns or shapes formed on a semiconductor wafer. These patterns are placed in many different layers. After all of the patterns for all of the layers are made, the semiconductor chip is complete, other than external wiring and packaging.

Often, a graphics file is used to store all of this pattern and shape information. Originally, the process of creating a graphics file was tedious, as each shape was physically laid out on a grid. Since then, these types of systems have become much more automated. Currently, designers use design tools that "hide" the actual graphical layout of the semiconductor chip. Instead, the designers use representations of individual or large parts, and the design tools then know how to actually layout the different parts. Once the design of the chip is complete, the design tools can output the graphics file. A semiconductor processing facility then uses the graphics file to create the semiconductor chip.

One common graphics file for semiconductor chips is called a "GL/1" graphics file, which is a particular file format that represents the graphical shape data for the chip. As is known in the art, a GL/1 graphics file contains a number of cells, which can range into the tens of thousands. Each cell has a number of "transforms", which can take a different cell and perform various functions on it (such as rotating it, mirroring it, arraying it, etc.). To one skilled in the art of computer science, the transforms act like "includes" in the sense that other cells are included in the current cell. Unlike software, however, the transforms can manipulate the included cells in physical terms. In GL/1 files, there is a "prime" cell which is essentially the master cell. There are also "leaf" or "base" cells where the transform will be "null", meaning that this cell does not include another cell. The base cells will be the building blocks that other cells can use. As such, these graphics files are nested and hierarchical because many cells may use the base cells and because some cells will include additional cells which themselves include additional cells, etc., until the base cells are finally included.

The cell structure of a GL/1 graphics file may be thought of as a tree: the prime cell is the root of the tree; the leaf or base cells are the leaves of the tree; and the cells between the prime cell and the base cells are the branches. It should also be noted that each cell is part of a level and the GL/1 graphics file will contain all of these levels. Because of this, when the GL/1 graphics file is examined through tools that allow the graphical shape data to be seen, a representation of the graphical shape data will be three dimensional.

Prior to manufacturing the semiconductor chip, the semiconductor processing fab generally runs checks and pre-manufacturing applications and processing on the graphics file. For instance, the facility might run "fill" functions that add metal shapes at levels for the optimum metal-to-oxide ratio to improve manufacturing yields. Alternatively, they could run a "cheese" function that removes metal to create the same optimum ratio. Additionally, the facility might run a very important "design rule checking" (DRC) function that checks to ensure that the patterns and shapes meet manufacturing design rules. If some of these design rules are not met, the chip may not function correctly or may have poor manufacturing yield.

The graphics files are beginning to create problems for semiconductor processing facilities. Without a method and apparatus for solving these problems, semiconductor processing facilities will be hampered more and more by these problems and need to invest in additional facilities improvements.

DISCLOSURE OF INVENTION

Before proceeding with a summary of the invention, it is beneficial to more particularly discuss the problems associated with graphics files. A major problem associated with these files is the amount of data needed for their representation. Contemporary graphics files can be as large as 3 gigabytes. In the future, even larger files will be prevalent. One common graphics file format is called "GL/1". This format contains all of the many levels and interconnects of the semiconductor chip. Current GL/1 processing tools allow single levels of GL/1 to be separated. However, to perform this function, these tools require the entire graphics file to be loaded into computer memory so that the tools can remove the particular level. It will continue to become much harder to use computer systems with the necessary memory capable of removing the levels. Moreover, as semiconductor technology increases, the number and complexity of the levels increases. Even if the levels can be separated from the graphics file, some of the levels are so complex that it takes lengthy computation time to process these complex levels. These requirements are only going to increase in a super-linear or exponential fashion.

Thus, without a way to partition and load balance graphical shape data for parallel applications, semiconductor processing facilities are going to continue to outlay capital expenditures for increasingly powerful computers having substantial amounts of memory or are going to simply reach a time when their most powerful computers cannot process the graphics files.

The preferred embodiments of the present invention solve these problems by splitting the large graphics file into smaller output "frames" of graphics files. The splitting process is load balanced amongst any number of processors. This allows many processors to be used in parallel to divide the large graphics file and to then process the resulting smaller frames. Additionally, the load balancing is performed in such a manner that only portions of the graphics file are loaded by any one processor. This reduces memory and computational requirements for any one processor. Preferably, the graphics file is divided in a three-dimensional manner, such that any one processor will be assigned one three-dimensional block or volume of the graphics file. The three-dimensional partition of the graphics file will become one frame, and the one processor accesses the graphics file to copy its three-dimensional partition into the new output frame. Applications, such as various check tools, may be used on each computer to process the graphics file. This divides application processing amongst the processors.

Preferably, a metric of "data density" is used to divide the graphics file. The "data density" metric is the ratio of graphics file data per three-dimensional block or volume of space. The data density could have units of, for instance, bytes per cubic millimeter. The data density metric is used to evaluate and divide the graphics files.

The foregoing and other features and advantages of the present invention will be apparent in the preferred embodiments of the invention, as illustrated in the accompanying drawings.

BRIEF DESCRIPTION OF DRAWINGS

The preferred exemplary embodiments of the present invention will hereinafter be described in conjunction with the appended drawings, wherein like designations denote like elements, and:

FIG. 11 is an example of the entries in a cell table;

FIG. 12 is an exemplary data density map;

FIGS. 13 and 14 are alternate data density ownership maps;

BEST MODE(S) FOR CARRYING OUT THE INVENTION

The preferred embodiments of the present invention solve the problems described in the Disclosure of Invention by dividing the large graphics file into smaller output "frames" of graphics files. The division process is load balanced amongst any number of processors. This practice is commonly referred to as "scaling" by those skilled in the art. The division process allows many processors to be used in parallel to divide the large graphics file and to then process the smaller output frames. Additionally, the load balancing is performed in such a manner that only portions of the graphics file need be loaded by any one processor. This reduces memory and computational requirements for any one processor. Preferably, the graphics file is divided in a three-dimensional manner, such that any one processor will be assigned one three-dimensional block or volume of the graphics file. Each three-dimensional partition of the graphics file will become one output frame, and each processor accesses the graphics file to copy its three-dimensional partition into the new output frame.

In the following discussions, the term "computer system" will be considered interchangeable with "processor", as the examples will generally consider multiple computer systems where each computer system has one processor. However, it should be noted that one computer system might comprise more than one processor. For instance, one computer system could have eight processors, and each processor could independently or collectively perform the present invention. This first computer system could be connected to another computer system having one processor, and this one processor could also perform the present invention at the same time as the first computer system.

Figure 3:
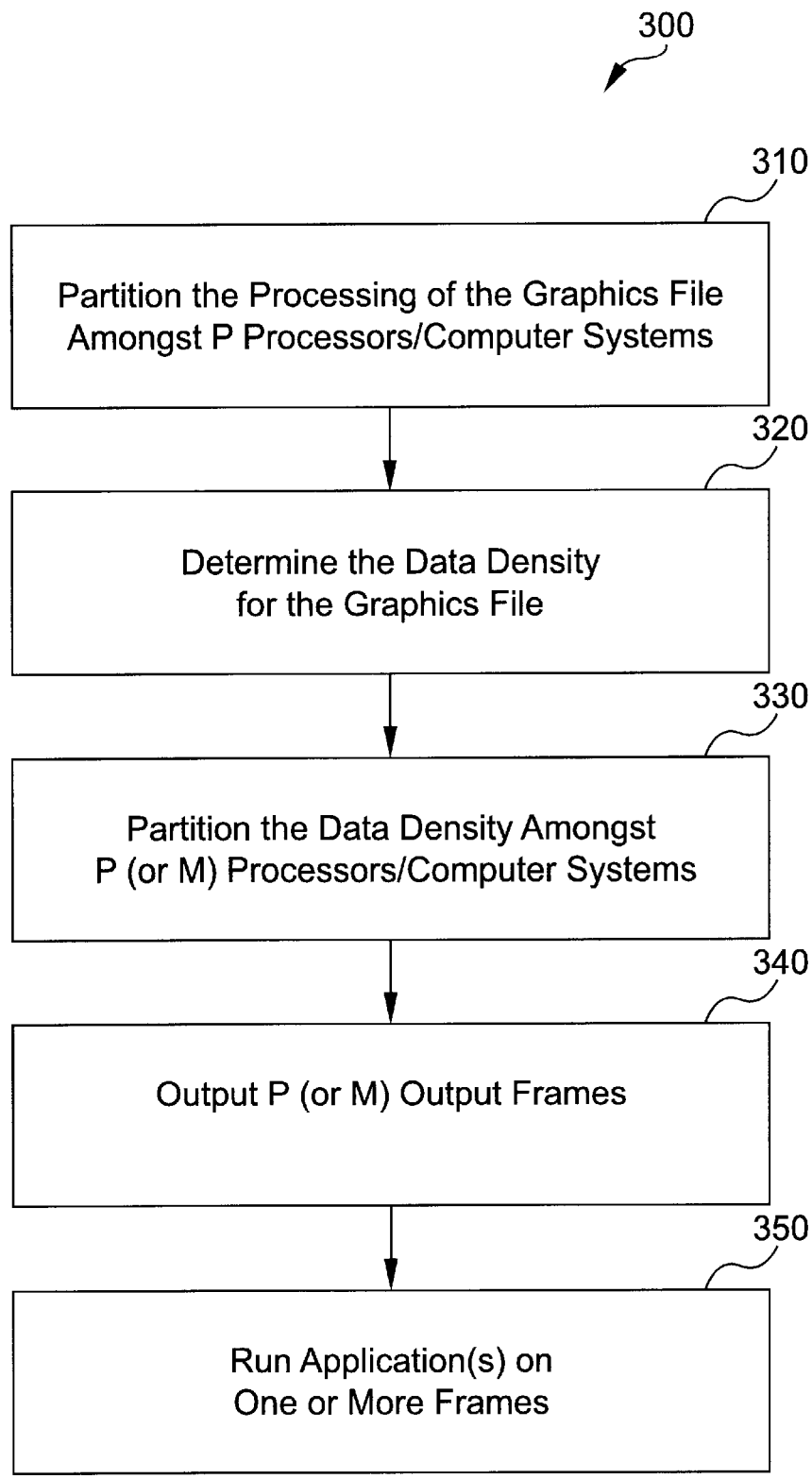
FIG. 3 is a preferred method for partitioning and load balancing graphical shape data for parallel applications.

The present invention may be more easily understood through method 300 shown in FIG. 3. Method 300 is a broad overview of the present invention and the method used whenever it is desired that a graphics file be partitioned into smaller blocks that can then be operated on by any number of applications, such as fill, "cheese", or design rule checking applications. These smaller blocks will be called "output frames" herein. In the methods discussed in the present invention, the method steps are not in order unless an order is necessary. Method 300 will initially partition the processing of the graphics file to a number of computer systems, which will determine the data density of the graphics file. The data density of the graphics file can then be used to more accurately partition the actual graphics file itself between computer systems. Each computer system then can extract an output frame of the graphics file.

Method 300 begins in step 310 when the task of processing the graphics file is partitioned among a certain number of computer systems. In the example of FIG. 3, there are P computer systems, each computer system having one processor. It should be noted that one or more of the computer systems may have more than one processor, and each processor may collectively or independently perform the present invention. However, for clarity and ease of discussion, each computer system will be though of as having only one processor in the following examples. Each of the P processors/computer systems is assigned to a partition. Preferably, each computer system determines the number of transforms in the prime cell. These transforms are called "prime" transforms. Each computer system will be informed of how many computer systems there are and then will select its share of prime transforms. The number of prime transforms selected per computer system will be the total number of prime transforms divided by the total number of computer systems. The computer systems will select the prime transforms in order. The order is preferably chosen by using the task identification (ID). The computer system with the lowest task ID will select a number of prime transforms, then the computer system with the next highest ID will select the next so many prime transforms, etc.

It should be noted that each cell in the graphics file describes graphical shape data in that each cell has transforms and/or primitive shapes. These transforms and primitive shapes will occupy some three dimensional space in the chip, which itself occupies a total three-dimensional space. The term "graphical shape data" corresponds to any transforms or primitive shapes described by one cell, and this graphical shape data for one cell will occupy a three-dimensional space in the chip. This three-dimensional space can be calculated for each cell. The transforms in each cell are graphical shape data because, even though cells are hierarchical and the transforms can describe other cells, at some point the primitive cells describe shapes. Thus, each cell can be considered to describe graphical shape data. It should also be noted that each cell will contain two-dimensional graphical shape data and a level. The combination of these make each cell describe a three-dimensional block.

In step 320, the data density for the graphics file is determined. The data density is a metric that relates the amount of data in a particular section of the space defined by the graphics file to the data in the graphics file. Each cell in the graphics file describes graphical shape data that occupy some volume. Likewise, the graphics file describes a chip and the chip occupies a volume. The data density is a metric used to describe the amount of data in a three-dimensional block of this chip volume, and it is a measure of how much data there is in the cells that map to a particular block. The data density may be two- or three-dimensional, but preferably is two-dimensional. For instance, since each cell contains information about which metal level (for example) it is on, the data density could describe the amount of data on this two-dimensional level. The data density could then include additional entries related to each level. In the most preferred embodiment of the present invention, the data density is two-dimensional and the three-dimensional chip volume is mapped to this two-dimensional space. In the abstract, the data density is a metric that estimates how much processing and memory will be needed for a section of the space defined by the graphics file. Any mechanism for doing this may be used as the data density.

Most preferably, the data density of the graphics file is determined through a data density map. The data density map is a map, preferably a two-dimensional matrix, that has numerical weights in each entry in it. Each numerical weight corresponds to a three-dimensional block of the graphics file. Each numerical entry preferably corresponds to the number of bytes of the GL/1 graphics file (or other graphics file) that are used to describe that three-dimensional block of the graphics file. Every cell will map to one or more of the entries in the data density map. Preferably, the amount of data density information for each cell will be the number of bytes of GL/1 statements that it takes to represent the cell in the binary file. Because the cells are hierarchical and nested, all of the cells included by the current cell are used to determine the byte amount for the current cell. For example, Cell 1 might be a leaf cell that contains 10 bytes. Cell 2 might be a branch cell that includes Cell 1 through a transform. This transform could be a step and repeat transform that repeats Cell 1 ten times. Cell 2 thus would take 100 bytes just to describe this one transform, and this does not include other data in the cell. All of the nested and hierarchical data from transform-included cells are preferably used to assign a value to each cell, as this will give a more accurate analysis of the processing and memory needed for each cell.

The number of bytes will thus be proportional to the processing and memory necessary to analyze a particular three-dimensional block. It should be noted that each entry in the data density map is only an estimate of the processing and memory that it will take to analyze a particular three-dimensional block. The exact processing and memory may be different. For instance, some applications can efficiently process "step and repeat" transforms—as described in the example of the previous paragraph—but the cell might be assigned a large number of bytes because of these transforms. In this instance, the large number of bytes might make it seem that the processing time will be more than it really is. In general, however, the number of bytes for a block corresponds to more memory and more processing.

Each computer system uses its selected prime transforms to search its part of the root, branches, and leaves. It determines all of the cells in its section of the graphics file and adds the weight of these cells to the data density map. The graphics file maps to the data density map. By this, it is meant that once the x,y location of a cell is known, the data density map's entry location is also known. However, this is preferably a "one-way" mapping in that knowing the entry location in the data density map does not necessarily allow one to determine the cell or cells that map to this entry location.

Once the data density map is complete, the data density map is approximately partitioned by weight amongst a second number of computer systems (step 330). Usually, the same P computer systems will be used, but a different set of computer systems ("M computer systems") may be used. Moreover, although it will be described herein that the number of output frames is equivalent to the number of processors/computer systems, this does not have to be the case. In particular, each processor/computer system can create more than one output frame. For instance, P computer systems could produce 2P or (P+5) output frames.

The total value of the data density map is determined and evenly divided amongst the computer systems. For instance, if the total value comes out to be a "100" and there are 10 computer systems, then each computer system will have 10 percent of the data density map. This is a relatively even division in that if the total value is "105" and there are 10 computer systems, there may be 9 computer systems having values of "10" and one computer system having a value of "11". Preferably, each computer system determines which cells of the graphics file correspond to its data density map and copies these cells from the graphics file into an output frame. Essentially, each processor is assigned a processor volume of the chip volume, and each cell that corresponds to this processor volume is copied into an output frame.

This generation of output frames occurs in step 340. At this point, the graphics file has been converted to P (or M) output frames that can then be operated on by applications (step 350), such as fill, cheese, or design rule checking.

Thus, FIG. 3 shows that there is some additional overhead as compared to previous methods for processing the graphics file. In particular, dividing the initial processing of the graphics file and determining the data density map are additional steps not previously performed. However, as will be shown in more detail below, the graphics file can be divided into much more manageable blocks without having to work on only one level of the graphics file or without loading all of the graphics file into memory. Additionally, the present invention scales linearly, meaning that increasing the number of computer systems decreases the processing time for the same size of graphics file. Moreover, current equipment, such as workstations, may be used so that supercomputers need not be purchased. Less memory per computer system or processor is needed, lowering the need for computers with massive amounts of memory.

Figure 1:
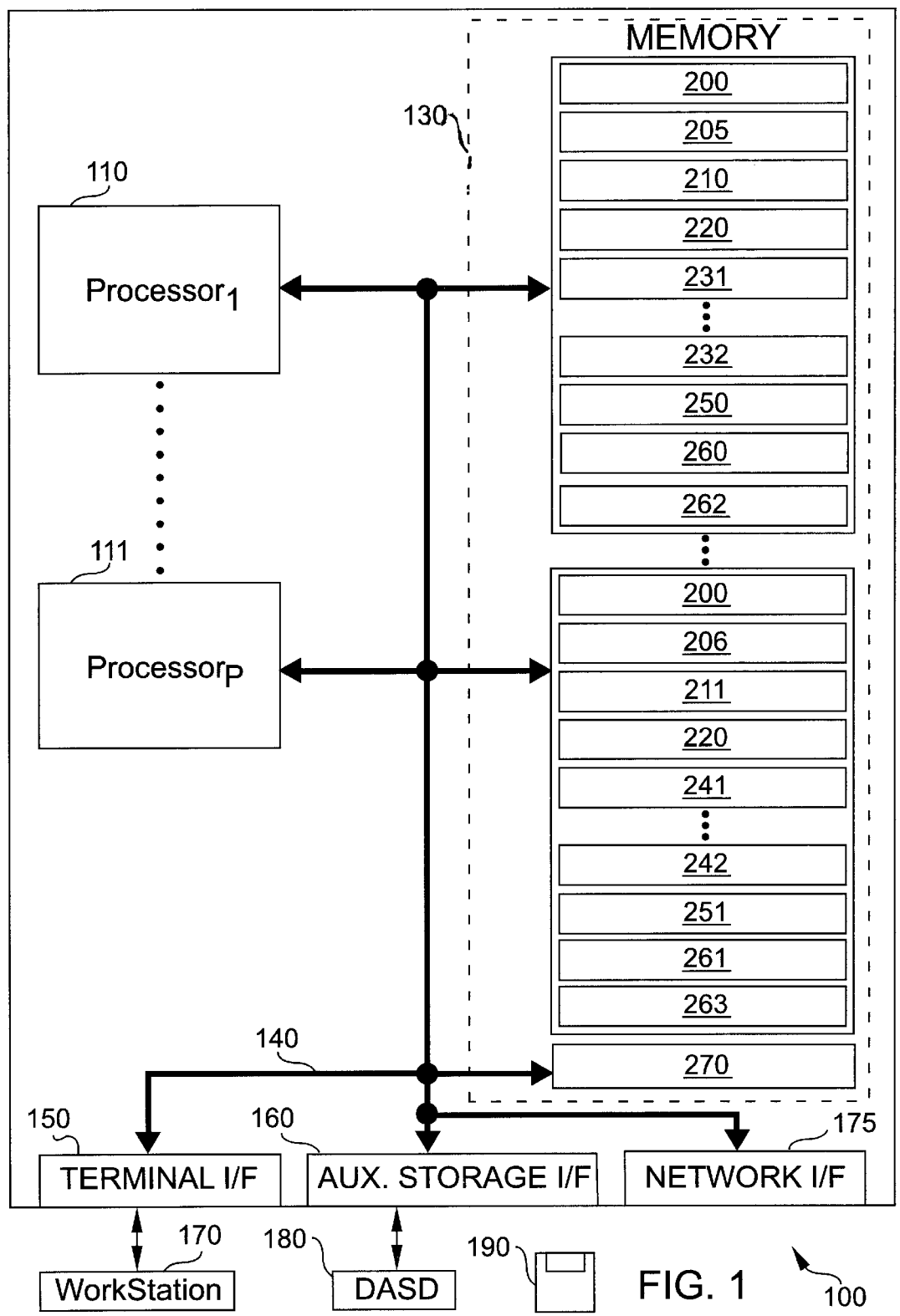
FIG. 1 is a computer system in accordance with a preferred embodiment of the present invention.

Turning now to FIG. 1, a computer system 100 in accordance with a preferred embodiment of the present invention includes P processors 110 through 111, a console 150, an auxiliary storage interface 160, a workstation 170, a network interface 175, a Direct Access Storage Device (DASD) 180 used for example with a read/writable medium such as floppy disk 190 or a compact disk, a bus 140, and a memory 130 that includes multiple locations for containing various software programs and data. In this example, memory 130 includes ParCE mechanisms 200, cell tables 205, 206, data density maps 210, 211, data density ownership maps 220, first P cell ownership vectors 231 through 232, second P ownership vectors 241 through 242, P output frames of which output frames 250 and 251 are shown, applications 260, 261, application outputs 262, 263, and graphics file 270. Many of these memory items are discussed with reference to other figures.

Processors 110 through 111 perform computation and control functions of system 100. All processors associated with system 100 may each individually comprise a single integrated circuit, such as a microprocessor, or may comprise any suitable number of integrated circuit devices and/or circuit boards working in cooperation to accomplish the functions of a central processing unit. All processors are capable of suitably executing the programs contained within memory 130 and acting in response to those programs or other activities that may occur in system 100.

Memory 130 is any type of memory known to those skilled in the art. This would include Dynamic Random Access Memory (DRAM), Static RAM (SRAM), flash memory, cache memory, etc. While not explicitly shown in FIG. 1, memory 130 may be a single type of memory component or may be composed of many different types of memory components. For example, memory 130 and processors 110 may be distributed across several different computers that collectively comprise system 100. For example, ParCE mechanism 200 may reside on one computer with processor$_1$, data density map 210 may reside on another computer system with a separate processor$_2$, output frame 250 may reside on another computer system on a third computer system with a different processor$_{n-1}$ and cell ownership vector 232 may reside on a fourth computer with a different processor$_n$. However, it is preferred that there be a ParCE mechanism 200, a data density map 210, an output frame 250, and multiple cell ownership vectors 232 per processor/computer system. Computer system 100 of FIG. 1 simply illustrates many of the salient features of the invention, without limitation regard to the physical location of Processors 10 or memory locations within memory 130.

Bus 140 serves to transmit programs, data, status and other forms of information or signals between the various components of system 100. The preferred embodiment for bus 140 is any suitable physical or logical means of connecting computer systems and components known to those skilled in the art. This includes, but is not limited to, direct hard-wired connections, fiber optics, infrared (IR) and other forms of wireless connections. It is anticipated that many alternative methods and material for connecting computer systems and components will be readily adapted for use with the present invention. This would include those methods and materials not presently known but developed in the future.

Console 150 allows human users to communicate with system 100, normally through a workstation 170. Workstation 170 is preferably a computer system such as a personal computer. Although system 100 as depicted in FIG. 1 contains only a single workstation 170, it should be understood that the actual number of workstations attached to system 100 will be a function of system design and user preference. Workstation 170 may also be a dumb terminal or other non-programmable computer input/output device which allows human interaction with computer system 100.

Auxiliary storage interface 160 represents any method of interfacing a storage apparatus to a computer system known to those skilled in the art. Auxiliary storage interface 160 allows auxiliary storage devices such as DASD 180 to be attached to and communicate with the other components of system 100. While only one auxiliary storage interface 160 is shown, the present invention anticipates multiple interfaces and multiple auxiliary storage devices such as DASD 180. For example, DASD 180 may be a disk drive which is capable of reading and writing programs or data on a disk. DASD 180 may also be any other type of DASD known to those skilled in the art. This would include CD-ROM drives, hard disk drives, optical drives, etc.

Network interface 175 is used to connect other computer systems to computer system 100 in networked fashion. One particular preferred networking configuration will be shown in FIG. 2. The present invention applies equally no matter how computer system 100 may be connected to other computer systems and/or workstations, regardless of whether the connection is made using present-day analog and/or digital techniques or via some networking mechanism of the future.

It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media to actually carry out the distribution. The program product tangibly embodies a program of machine-readable instructions executable by a computer system having an operating system. The program product, in combination with a computer system, directs the computer system to perform the embodiments of the current invention and any steps taken by these embodiments. Examples of signal bearing media include recordable type media such as floppy disks (e.g., disk 190) and CD ROMS, and transmission type media such as digital and analog communication links, including wireless communication links.

ParCE mechanisms 200 are tools that create the cell tables 205, 206 the data density maps 210, 211 the data density ownership maps 220, the first P cell ownership vectors 231 through 232, the second P cell ownership vectors 241 through 242, and the P output frames 250, 251. "ParCE" stands for "Parallel Chip Enable", as the ParCE mechanism enables a graphical representation of a chip to be broken into smaller blocks called output "frames". Application(s) 260, 261 can perform GL/1 processing, such as fill, cheese, and design rule checking, on each of the P output frames. Application outputs 262, 263 may be one file containing all of the output from all of the P output frames, or there could be P separate application outputs 262, 263. Additionally, if there are multiple applications, there could be one or more outputs per application.

Some computers systems have many processors in one physical unit and the present invention is as equally applicable to this type of computer system as it is to many computer systems interconnected through networks. Additionally, combinations of these two types of systems may also be used to perform the present invention.

Figure 2:
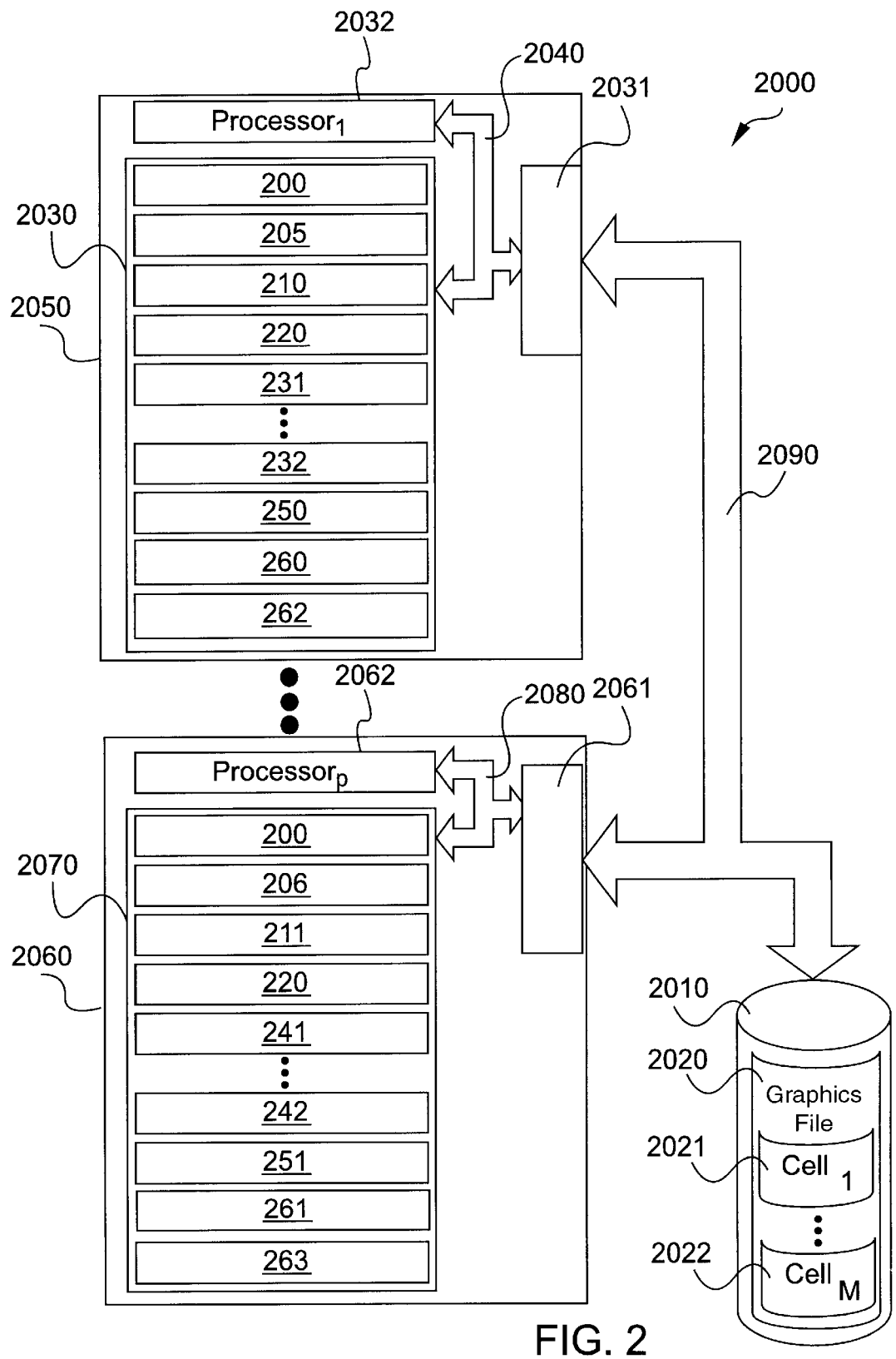
FIG. 2 is a group of interconnected computers, in accordance with a preferred embodiment of the present invention, wherein each of the computers accesses a graphics file and produces an output frame.

Turning now to FIG. 2, FIG. 2 illustrates a preferred network configuration for the most preferred embodiment of the present invention. Network configuration 2000 comprises P computer systems 2050 through 2060 that are connected to a Shared File System (SFS) 2010 and to each other through network 2090. SFS 2010 comprises graphics file 2020 and allows access to the graphics file by each or all of the P computer systems 2050 through 2060. Each of these computer systems preferably comprises at least one processor (one processor per computer system is shown in FIG. 2 and will be assumed for clarity and ease of discussion), a memory, an auxiliary storage interface, a network interface, and an operating system. Additionally, each computer system may also comprise a DASD, and other assorted devices, as is known in the art. Most of these items are not shown in FIG. 2 for simplicity.

Computer system 2050 comprises a processor 2032 connected to memory 2030 and network interface 2031 through bus 2040. Memory 2030 comprises a ParCE mechanism 200, a cell table 205, a data density map 210, a data density ownership map 220, P cell ownership vectors 231 through 232, an output frame 250, application(s) 260, and application output 262. Computer system 2060 comprises a processor 2062 connected to memory 2070 and network interface 2061 through bus 2080. Memory 2070 comprises a ParCE mechanism 200, a cell table 206, a data density map 211, a data density ownership map 220, P cell ownership vectors 241 through 242, an output frame 251, application(s) 261, and application output 263.

Each ParCE mechanism 200 is a device that reads graphics file 2020, partitions the processing of the file, partitions the data density map, and creates one output frame of the output frames 250, 251. Because of the P computer systems 2050 through 2060 in network configuration 2000, there would be P output frames 250, 251. In the most preferred embodiment of the present invention, the graphics file 2020 is a GL/1 file. Each of the P output frames 250, 251 meet the GL/1 standard. Application(s) 260, 261 may be used to perform processing, such as fill, cheese, or design rule checking, on the frames 250, 251.

Graphics file 2020 comprises M cells 2021 through 2022. Each cell has a transform that references another cell or cells. Alternatively, a cell could be a building block cell (called a "primitive" or "leaf" cell) such that it will not reference another cell. Because cells may be referenced in this manner, the graphics file 2020 is nested and hierarchical. There will generally be many levels of graphical data in the file, such as several metal layers M1, M2, M3 or connective "via" levels V1, V2, V3, etc.

The cell tables 205 each comprise a plurality of cell entries, one for each of the cells 2021, 2022. An exemplary cell tables will be shown in reference to FIG. 11. The data density maps 210, 211 are filled by the ParCE mechanisms 200. ParCE mechanisms 200 are executed by each processor 2032, 2062 and computer system 2050, 2060, preferably through a Message Passing Interface (MPI). A MPI is a standard communication protocol for distributed processing.

Data density maps 210, 211 act as indications of how complex each partition is of the graphics file 2020. Preferably, the graphics file 2020 will be divided by the ParCE mechanisms 200 into three-dimensional partitions. Data density ownership maps 220 are maps of which computer system is assigned which section of the data density maps 220, 211. The data density ownership maps 220 allow each computer system to determine which part of the graphics file will be theirs. In combination with the cell ownership vectors, the data density ownership map allows each computer system to extract its own data from the graphics file 2020 and to create its own output frame 250. Cell ownership vectors 1 through P 231, 241 through 232, 242 allow each computer system to determine which of the cell entries of the cell tables 205, 206 are assigned to this computer system.

Cell tables 205, 206 will be different between the various computer systems, as each computer system is initially given part of the graphics file 2020 to search and examine. When examining the graphics file in filling in the portion of the cell table that belongs to it, the computer system also can add to its data density map. At the end of this process, the various P data density maps will be communicated between computer systems. Additionally, prime cell native shapes (shapes not in transforms) will be added to the data density map as a final step. Each computer system can create its own data density ownership map, which should be an exact copy of the other data density ownership maps in the other computer systems.

Basically, once the data density map is partitioned amongst the P computer systems or processors, each computer system is assigned part of the data density map that then belongs to it. Each computer system can examine one of the cell entries in the cell table. A portion of the cell table will be filled in by this particular computer system. Each cell entry, in the part of the cell table that is assigned to this computer system, has a bounding box that delineates the two-dimensional space taken by the cell. If this two dimensional space maps to one location in the data density map, the number of bytes of the cell are added to this particular location in the data density map. If this two-dimensional space maps to more than one location in the data density map, the number of bytes of the cell are averaged over the number of locations in the data density map. For example, if the two-dimensional space maps to 10 locations in the data density map and the cell has 100 bytes, a computer system would add an additional 10 bytes into each of the 10 locations. It should be noted that GL/1 files, which are the most preferred graphic file formats, are stored in binary format.

Although it seems as if only two-dimensional partitions of the graphics file are examined through this process, each cell 2021, 2022 in the graphics file 2020 has a level associated with it and contained within the cell. By examining the two-dimensional space that the cell describes, each level can be mapped to an appropriate location in the data density map. Thus, three-dimensional partitions are used, but these are mapped into a two-dimensional data density map. For example, if cell 2021 is metal level M1 and has an x,y value of 100,100, then this might be mapped into column 10 and row 20 of a data density map. If cell 2022 is metal level M2 and has an x,y value of 100,100, then this would be mapped into column 10 and row 20 of the same data density map. Even though these cells describe graphical data that is at two different vertical levels, because the graphical data covers the same x,y locations, the data is mapped to the same location in the data density map.

Once the data density map is partitioned amongst the P computer systems or processors, each computer system identifies to which part of the data density map it is assigned. Each computer system can examine one of the cell entries in the portion of the cell table filled in by it. In the most preferred embodiment of the present invention, the data density map's columns are divided between processors. Each processor thus receives a particular piece of the entire chip's volume. The columns of the data density map relate to x-axis values for the chips. By dividing columns of the data density map between computer systems, each computer system can determine which x-axis values are assigned to it. For example, if the chip has x-axis values between 0 and 99, and there are 10 columns in the data density map, each column will correspond to 10 x-axis values (column 0 will correspond to x-axis values 0 through 9, column 1 will correspond to x-axis values 10 through 29, etc.). If computer system one is assigned column 0, then it will be assigned to x-axis values 0 through 9. If a cell has any graphical data within these x-axis values, then the cell is assigned to this computer system.

By mapping the x,y coordinates of a cell to the data density ownership map in this manner, each computer system determines which computer system owns this particular cell. Each cell ownership vector contains the same number of entries as there are cells in the graphics file. For instance, if there are Z cells in the graphics file, then there will be Z entries in each cell ownership vector. Thus, each entry in the cell ownership vector corresponds to one of the cells in the graphics file. Generally, each computer system will have P cell ownership vectors, one cell ownership vector per computer system. In this manner, one computer system can mark entries in each cell ownership vector and then all of the computer systems can communicate each cell ownership vector. Alternatively, each computer system could have its own cell ownership vector for itself and not have the other P-1 cell ownership vectors. However, the latter entails communicating, between computer systems, each of the many cells as opposed to communicating (or "reducing") the cell ownership vectors, as is the case in the former situation. Thus, the former situation tends to be more efficient.

One of the computer systems can mark an entry in one of the cell ownership vectors with an appropriate value that indicates that this entry (and therefore the cell in the graphics file) is owned by a particular computer system. Again, if the cell in the graphics file spans multiple data density map locations, more than one particular computer system may be assigned the cell, and this computer system will write to multiple cell ownership vectors. Most preferably, at the end of the process, each computer system communicates, through a process known as reduction or MPI_Reduce, the cell ownership vectors with the other computer systems.

When each computer system completes this processing, each computer system will have its cell ownership vector filled in and correct. Thus, each computer system will identify those cells of the graphics file that are assigned to it. However, the other P-1 cell ownership vectors local to this computer system generally will not be complete. Each computer system then uses its cell ownership vector to access the graphics file and copy the cells assigned to it from the graphics file to an output frame. Thus, most preferably there will be P output frames, one output frame per computer system. Each of these frames may be independently operated on by application(s) 260, 261 in each computer system. In this manner, each computer system or processor should contain an output frame that takes approximately the same processing time to process by any particular tool. For instance, output frame 260 might take 30 minutes to be processed by a design rule checking tool. Output frame 261 should also take a similar time to be processed by an application such as a design rule checking tool.

Furthermore, each computer system only creates a cell table instead of loading into memory the entire graphics file. While the number of entries in each of the cell tables 205, 206 is equivalent to the number of cells in the graphics file, each entry in the cell table generally contains much less information than the cell itself. First, each computer system only "fills in" the cell table entries for cells that are assigned to it during an initial partitioning of the graphics file. These are "local" cell table entries. The "remote" cell table entries—which are those cell table entries for cells not assigned to this processor—only preferably contain the seek position of the cell in the graphics file and the cell number of the cell. For local cell table entries, the seek position, cell transforms, the cell number, the data density count for the cell, and a bounding box are all that are really needed in an entry for each cell.

Thus, the memory requirements for each computer system are much smaller than the memory requirements to load the entire graphics file 2020. In general, the present invention could take more overall memory, more overall operations to compute the partitioning, and more global communication (on the order of the logarithm of the number of computer systems or processors) to produce a better partitioning of the graphics file. Each computer system can then operate on the smaller output frames. It should be noted that more columns and rows for the data density map will create better partitioning of the graphics file. However, there will also be more computational requirements and communication for more columns and rows for the data density map.

Thus, the network configuration 2000 of FIG. 2 allows a very large graphics file to be initially partitioned between any number of processors or computer systems, allows the graphics file to be processed to determine a data density map that is an indication of the complexity of each block of the graphics file, allows the data density map to be partitioned between computer systems, and allows the graphics file to broken into smaller output frames in accordance with the partitioning of the data density map.

Returning briefly to FIG. 3, the method of FIG. 3 may be performed in many different manners. In the most preferred embodiment of the present invention, method 300 comprises creating and filling a cell table (FIG. 18), determining and partitioning the data density map (FIG. 19), and creating and outputting a frame (FIG. 20). The ParCE mechanism, shown in FIGS. 1 and 2, preferably performs the steps of FIGS. 18 through 20. The following discussion will use these methods in addition to other figures to explain the invention.

Returning to FIG. 2, the ParCE mechanisms 200 are sent to each computer system. In certain systems, this is performed through a command that accepts as input the executable file and a host list. The host list directs the network as to which computer systems on which the mechanism might be used and the number of these computer systems to use. For example, the host list might have 10 of 30 computers in the network and an indication to use five of these computers. Five of the 10 computers would be assigned to perform this function. Each computer system then would execute the ParCE mechanism 200 and communicate, when necessary, with other computer systems. In the following examples, it will be assumed that three computer systems are preforming the methods of the present invention.

Figure 4:
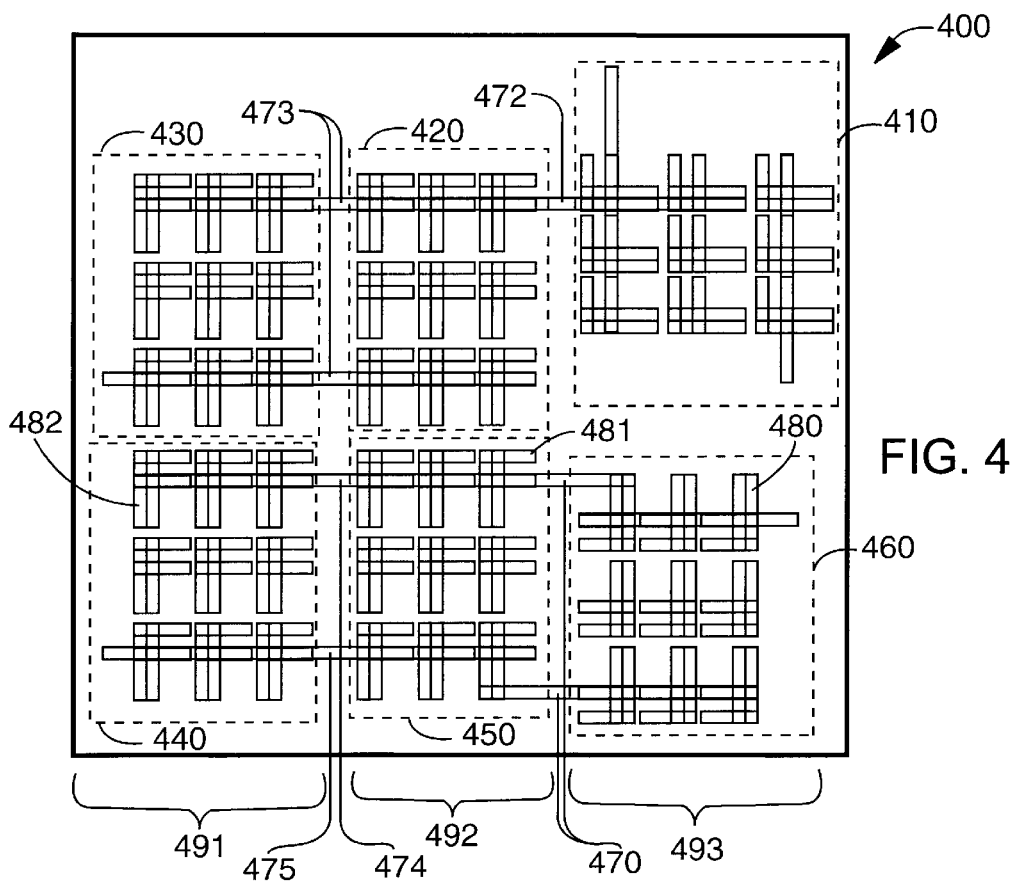
FIG. 4 is an exemplary representation of one layer of a graphics file.
Figure 18:
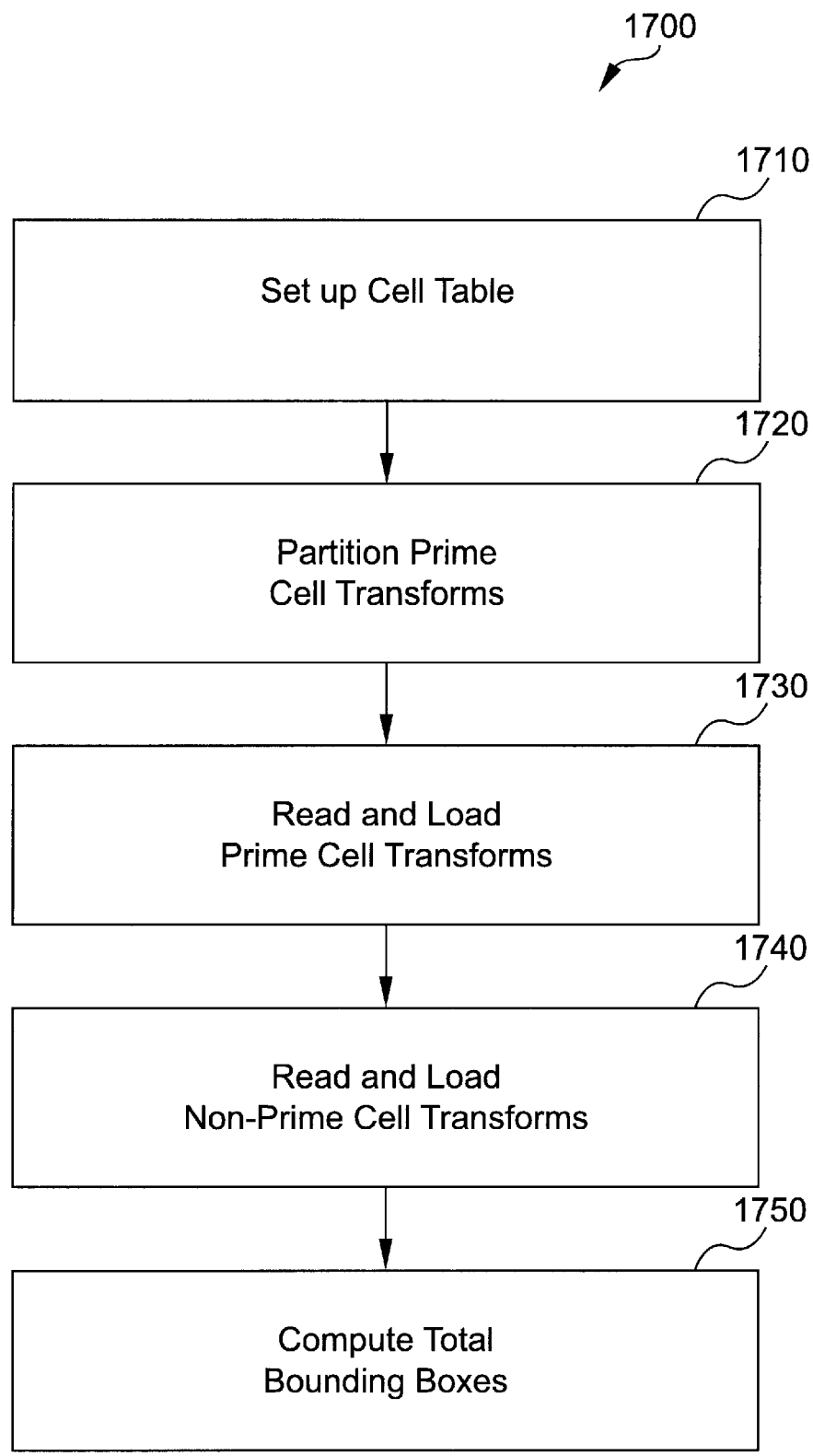
FIGS. 18 through 20 are preferred methods for, respectively, setting up and creating a cell table, creating a data density map and partitioning the data density map, and creating an output frame.

Referring now to FIGS. 4 and 18 in addition to FIG. 2, FIG. 4 shows an exemplary representation 400 of a graphics file 2020, as it would appear in a graphics display tool, which is a tool that allows the graphics file to be viewed. In this simple example, there is only one layer, but normal graphics files comprise many layers. Representation 400 comprises three partitions 491, 492, 493. Partition 491 comprises two groups 430, 440 of graphical shapes. Similarly, partition 492 comprises two groups 420, 450 of graphical shapes and partition 493 comprises another two groups 410, 460 of graphical shapes. Between each partition 491, 492, 493 are shapes 473, 474, 475 and shapes 472, 470. Each partition comprises nine F-shaped graphical shapes. Only shapes 480, 481, 482 have been marked for simplicity.

Representation 400 would be described in graphics file 2020 beginning with a "prime" cell. All other cells are related to this cell. In essence, the prime cell is the "root" of the cell "tree". Partitions 491, 492, 493 would each be transforms in the prime cell. Transforms in the prime cell are referred to as "prime transforms". In this simple example, there are six prime transforms. Two prime transforms refer to groups 430, 440; another two prime transforms refer to groups 420, 450; finally, the third set of two prime transforms refer to groups 410, 460. Each of the groups would refer, through transforms, to the nine "F" shapes and two protruding rectangles that make each group.

FIG. 18, meanwhile, shows a method 1700 for creating and filling a cell table. Method 1700 represents the beginning part of the steps taken by a ParCE mechanism. The cell tables 205, 206 are used to provide easy access to the cells of the graphics file 2020 and to allow the dimensions of each cell in the graphics file to be determined. In step 1720 of FIG. 18, each computer system sets up its own cell table 205, 206. Each computer system searches the graphics file from the prime transforms to the primitive or leaf transforms, which are the "leaves" of the tree. This allows the cell table 205, 206 to be filled with seek information to make it easier to access individual cells of the graphics file 2020. In step 1720, the prime cells are partitioned amongst computer systems. In the current example, there are six prime cell transforms, and each of the three computer systems will take two of the prime cell transforms. The prime cell transforms are preferably distributed by having the computer system with the lowest taskID (task identification) take a first amount of prime transforms. The amount taken will be approximately the number of prime transforms divided by the number of computer systems. The computer system with the next lowest taskID would take a second amount of transforms equal to approximately the same amount, etc. For example, if there 100 prime transforms and three computer systems, the first computer system would take 33 prime transforms, the second would take another 33 prime transforms, and the last would take 34 prime transforms.

In step 1730, each computer system read and loads its assigned prime transforms. This process essentially is trying to evenly divide the graphics file between computer systems or processors. However, the actual processing time may be different. For instance, one group of 33 prime transforms may be much more complex than another group of 33 transforms. Without more processing, there is no way to actually determine how long each "branch" to which the prime transform points will take to be processed.

Figure 5:
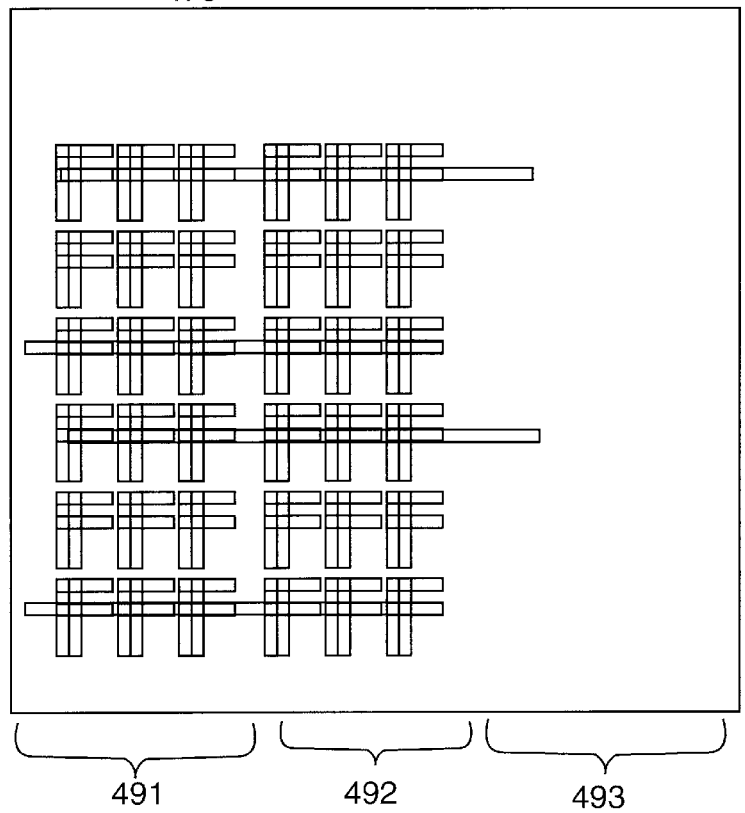
FIGS. 5 through 7 are separate exemplary representations of how the layer of FIG. 4 would be partitioned between processors.
Figure 6:
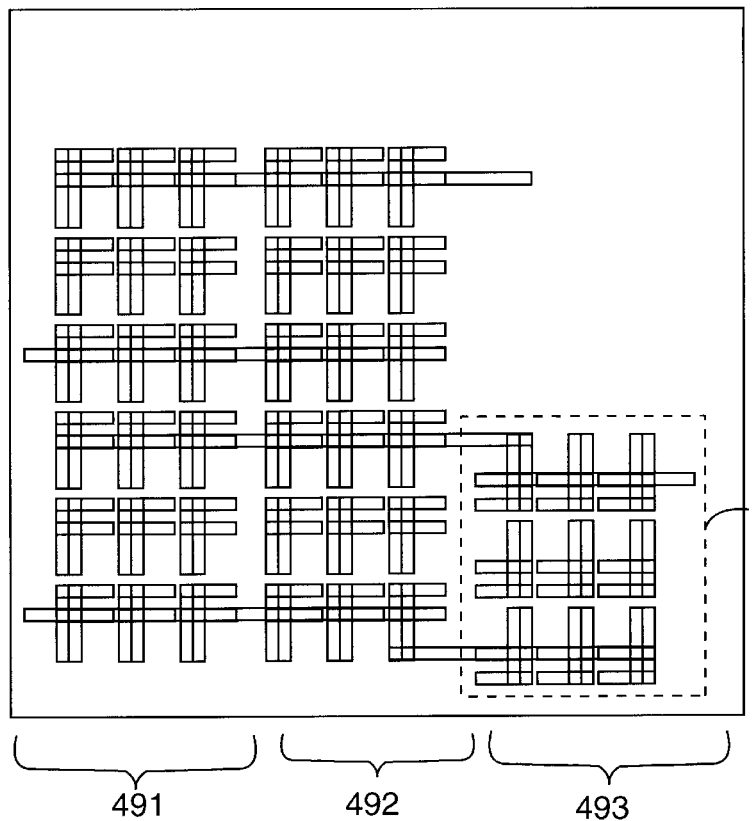
Figure 7:
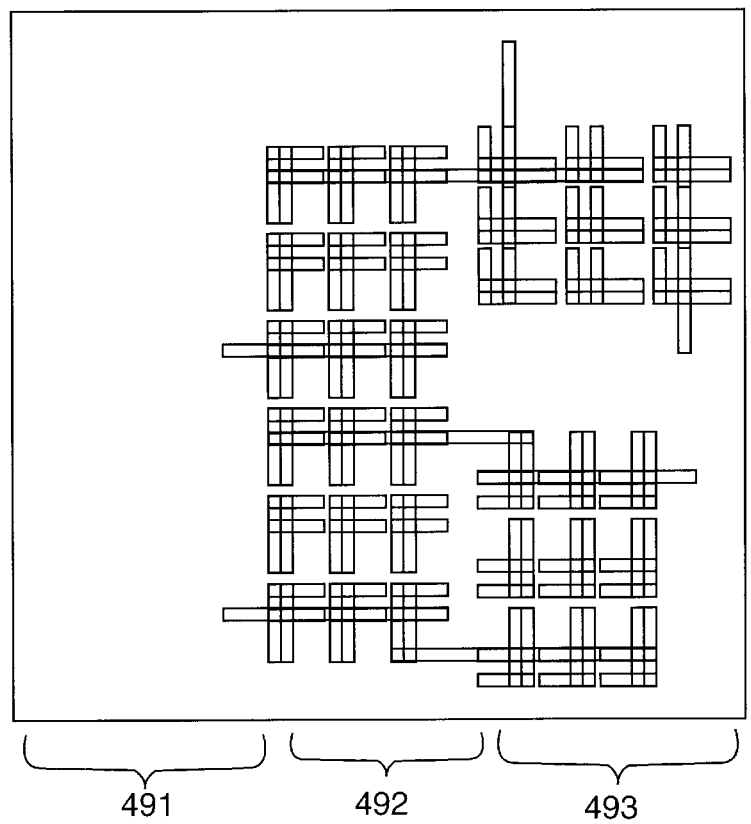

The division process is shown in FIGS. 5 through 7. In FIG. 5, computer system/processor one takes partition 491, which is pointed to by two prime transforms. In FIG. 6, computer system two takes partition 492, which is pointed to by another two prime transforms. Finally, in FIG. 7, computer system three takes partition 493, which is pointed to by a third set of two prime transforms. Thus, each computer system evenly divides the prime transforms amongst themselves.

It should be noted that FIGS. 5 through 7 are used to illustrate more than one concept. The first concept is that initially each computer system is assigned a number of prime transforms and each computer system will fill a cell table with data corresponding to the prime transforms. In the example of FIGS. 5 through 7, the prime transforms happen to be in columns. In general, this will not be the case. For instance, computer system one could be assigned prime transforms for groups 430 and 460.

FIGS. 5 through 7 also illustrate that the present invention tries to divide the chip volume into smaller volumes and assign these volumes to multiple computer systems. In the most preferred embodiment of the present invention, vertical divisions are used to partition the chip. Thus, partitions 491, 492 and 493 are determined and assigned to three computer systems one, two, and three, respectively. FIG. 5 illustrates what an output frame for computer system one would look like, if the output frame were viewed in a display tool. Information from partition 492 is also output to the output frame, even though the computer system is assigned partition 491. FIG. 6 illustrates what an output frame for computer system two would look like, if the output frame were viewed in a display tool. FIG. 6 likewise illustrates that information from partitions 493 and 491 is output to the output frame, even though computer system two is assigned partition 492. Finally, FIG. 7 illustrates what an output frame for computer system three would look like, if the output frame were viewed in a display tool. FIG. 7 likewise illustrates that information from partition 492 is output to the output frame, even though computer system three is assigned partition 493.

The reason that "extra" information is added to the output frame is that cells that include the graphical shapes between partitions will have to be split to accommodate cutting the graphical shapes. Breaking up the cells that include the graphical shapes 473, 474, 475, 472, and 470 can be complex. To avoid this complexity, the graphical shapes that leave or enter the computer system's volume are output to an output frame even if the computer system is not assigned to this other volume. If a graphical shape enters a computer system's assigned volume, then the cell having the graphical shape is included in the computer system's output frame. An example of this is the bottom graphical shape 475, which leaves partition 492 and enters partition 491 (note that group 450 is essentially group 410 rotated counter-clockwise 90 degrees). Because this cell is included in the output frame, the entire hierarchy tree from a prime transform that includes this cell is also sent to the output frame for partition 491.

If desired, the output frames may be windowed at a later time. It should be noted that there are windowing functions that can trim cells. However, the windowing functions require that the entire graphics file be loaded in order for the function to work. It can be seen through FIGS. 4 and 5 that an output frame is smaller than the original graphics file. Thus, even though the windowing function still must load the entire output frame in order to further partition the output frame, the output frame takes less memory and processing than does the original graphics file.

In step 1740 of FIG. 18, the computer system reads and loads the non-prime cell transforms. Preferably, this is performed through a "depth first traversal" algorithm, which is a well known algorithm. During step 1750, bounding boxes are created. A bounding box is an imaginary rectangle into which the graphical shapes for the cell would fit. The bounding box can be considered a volume because each of the cells contain level information; however, the data for the bounding box is kept as rectangular information. Preferably, this step is also performed through a "depth first traversal" algorithm. Turning to FIGS. 8 through 11 in addition to FIGS. 2 and 18, FIGS. 8 through 10 show cell hierarchical trees which are a visual representation of cell tables (such as cell tables 205, 206) for computer systems one, two, and three, respectively, and FIG. 11 shows an exemplary cell table. Each hierarchy is a subtree of the original graphics file 2020. Ideally, each computer system will read all cells in graphics file 2020 to at least set up the seek location for each cell in the graphics file. However, after this point, the cells that need to be filled in are the cells and transforms being worked on by this computer system, which are the cells included and pointed to by the prime transforms assigned to this computer system. Thus, FIGS. 8 through 10 only show the cells that each computer system is separately assigned.

Figure 8:
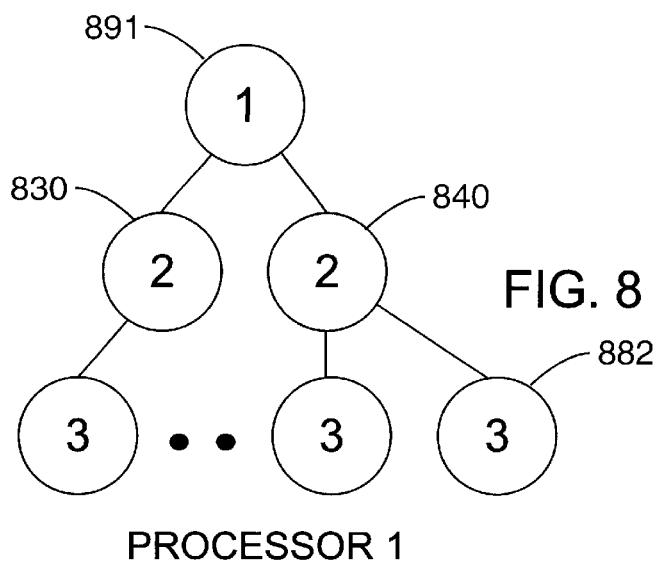
FIGS. 8 through 10 are examples of cell trees for various processors.
Figure 9:
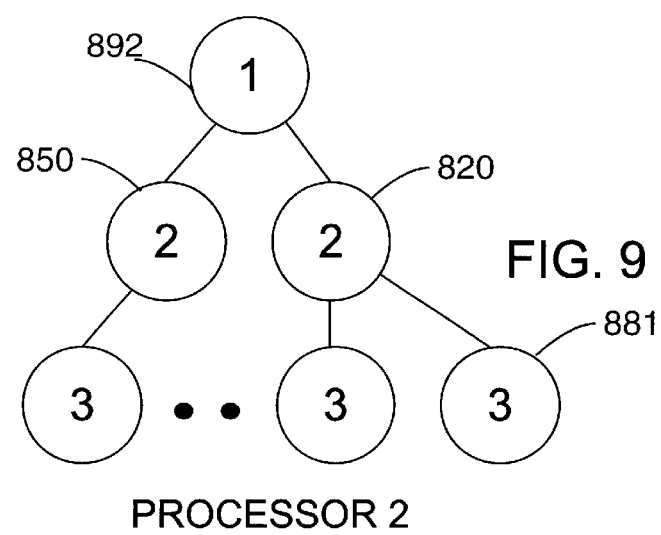
Figure 10:
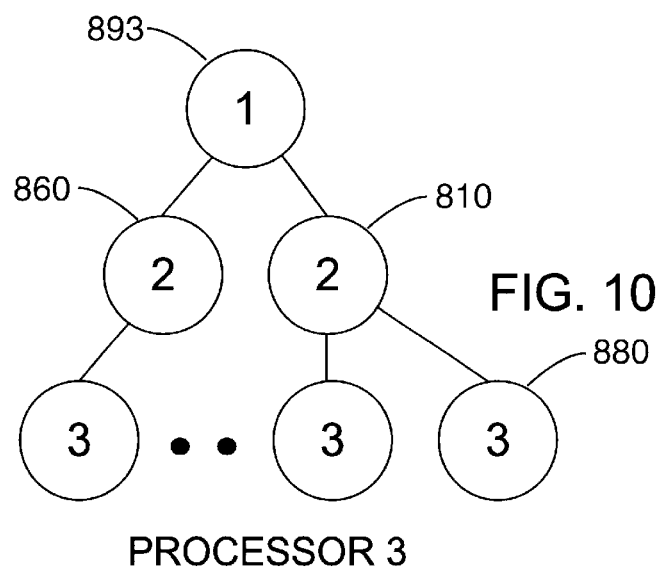

In FIGS. 8, 9, and 10, entries 891, 892, 893 correspond to prime cell 400 in FIG. 4. The lines between layers (1, 2, and 3) are transforms that include other cells. Entries 830, 840, 850, 820, 860, and 810 correspond to cells 430, 440, 450, 420, 460, or 410. Similarly, entries 882, 881, and 880 correspond to the cells making up the former groups and, in particular, the single F-shaped cells in FIG. 4 (such as cells 482, 481, and 480, respectively). Thus, each computer system starts with a prime cell (labeled "1"), goes through two prime cell transforms to include another two cells (labeled "2"). Each second layer has nine transforms that point to nine cells describing the nine F-shaped graphical shapes.

In this example, there are three "layers" of nesting in the cell tables shown in FIGS. 8 through 10. The "leaves" are the bottom layer of cells (marked "3" in the figures). The "root" are the cells marked "1" in the figures, which are the prime cell's transforms. Each figure represents a hierarchical subtree that is assigned to one computer system, each subtree representing part of the graphics file.

FIG. 11 is an example of the types of data kept in each entry of a cell table. In this figure, "Cell 1" corresponds to entry 891; "Cell 2" corresponds to entry 840; and "Cell 3" corresponds to entry 882. Cell 1 would actually have two prime transforms in it: one to group 830 and another to group 840. Only one prime transform is shown for clarity. Cell 2 represents a "branch" and Cell 3 represents a "leaf", or a base cell. The transforms are of the form (as shown in Cell 1), "cell, m, a, tx, ty, dx, dy, nx, ny". The "cell" is a number that corresponds to the cell to which it refers. Mirror (m) is either 0 or 1, meaning that the graphical shape will not or will, respectively, be mirrored. The "a" indicates the angle of rotation. The "tx" and "ty" are indications of how far the x and y coordinates are translated. The "dx" and "dy" are indications of distances between each of the x's or y's when repeating a graphical shape. Similarly "nx" and "ny" are the number of x's and y's when repeating a graphical shape. These allow a designer to make a matrix of shapes.

The very last "X(Xmin, Xmax)" and Y(Ymin, Ymax) is a bounding box. This is created by the ParCE mechanism and is calculated by determining a box into which the graphical shapes pointed to by the transform would fit. The transform in Cell 1 could have a transform of "2,0,0,0,0,0, 0,0,0" and whatever the bounding box is, for example. The X and Y information in each cell is a bounding box for the cell itself, including all transforms. Each transform also has a bounding box calculated, and the cell's bounding box fits all of the other bounding boxes. For instance, in Cell 2, there is a transform of the information in Cell 3. The transform causes the graphical data described by Cell 3 to be mirrored on the X axis. Thus, the bounding box for the transform is (−200,−1636) in X axis coordinates because it is a mirrored version of the graphical information from Cell 3, which has X axis coordinates of (200,1636). The bounding box for Cell 2 still is larger than the bounding box for the transform in Cell 2. Basically, a computer system calculates the bounding box for the cell by calculating the largest box into which the bounding boxes for each of the graphical data included by transforms would fit.

The benefit of a depth first traversal is that the nested cell's bounding boxes can be calculated. Because Cell 1 depends on Cell 2, which in turn depends on Cell 3, the bounding box for Cell 3 must be calculated before the bounding box for Cell 2 would be calculated. Similarly, the bounding box for Cell 2 would have to be calculated before the bounding box for Cell 1 could be calculated. The depth first traversal is an algorithm that allows nested cells to be examined before "higher" cells, because the depth first traversal starts at the "leaves" and ends at the "root".

Preferably, one depth first traversal is used to read each cell assigned to the computer system and to fill in the transform and byte information. As shown in FIG. 11, the byte information indicates how many bytes of the graphics file 2020 are needed to represent this cell and the cells to which this cell points through transforms. Although the number of bytes of information are not always proportional to the memory and processing requirements of this cell, in general this is the case.

It should be noted that the byte information in the entries in the cell table is the byte information for this cell and the byte information to which this cell points. The total byte information included by the cell and the cell own's size will be calculated in order to develop a determination as to the data density. For instance, Cell 2 depends on Cell 3. To determine a value of bytes assigned to Cell 2, the bytes from Cell 3 will be included because Cell 2 includes Cell 3 through a transform. Referring to FIG. 4 in addition to FIG. 11, Cell 3 is one of the nine F-shaped devices (such as device 480), and Cell 2 includes nine of the F-shaped devices. Thus, Cell 2 will have transforms that include and describe the nine transforms for these devices. This could be done by nine transforms, or one transform could matrix the nine devices. Therefore, the total number of byte information in Cell 2 will be 193 bytes for this cell plus nine times 1176 bytes (the number of bytes in Cell 3). This will yield a total of 10,778 bytes.

Similarly, Cell 1, which in this example is a column of data such as column 493, includes two of the Cell 2 cells. Therefore, the total number of byte information in Cell 1 is 132 bytes for this cell plus two times 10,778 bytes, for a total of 21,688 bytes. Thus, the hierarchical structure of the graphics file is taken into account when determining the data density.

Preferably, a second depth first traversal is used to compute the bounding box of each cell. It should be noted that one depth first traversal could be used to read the cells, fill in byte and seek information, and compute the bounding box information. However, splitting these functions is simpler and more easily debugged. The bounding box information is added to each entry for this computer system in its cell table. These steps occur in step 1750 of FIG. 18. Also in step 1750, a bounding box for each computer system's hierarchy subtree is calculated by each computer system. The entire bounding box for the entire prime cell is also calculated by comparing each computer system's minimum X value with other computer system's minimum X values and choosing the smallest minimum X value. Similarly, the maximum X value, minimum Y value, and maximum Y value of the entire prime cell may be determined. Ideally there would be four "MPI_Allreduce" commands to achieve this. However, this will vary depending on implementation.

Figure 19:
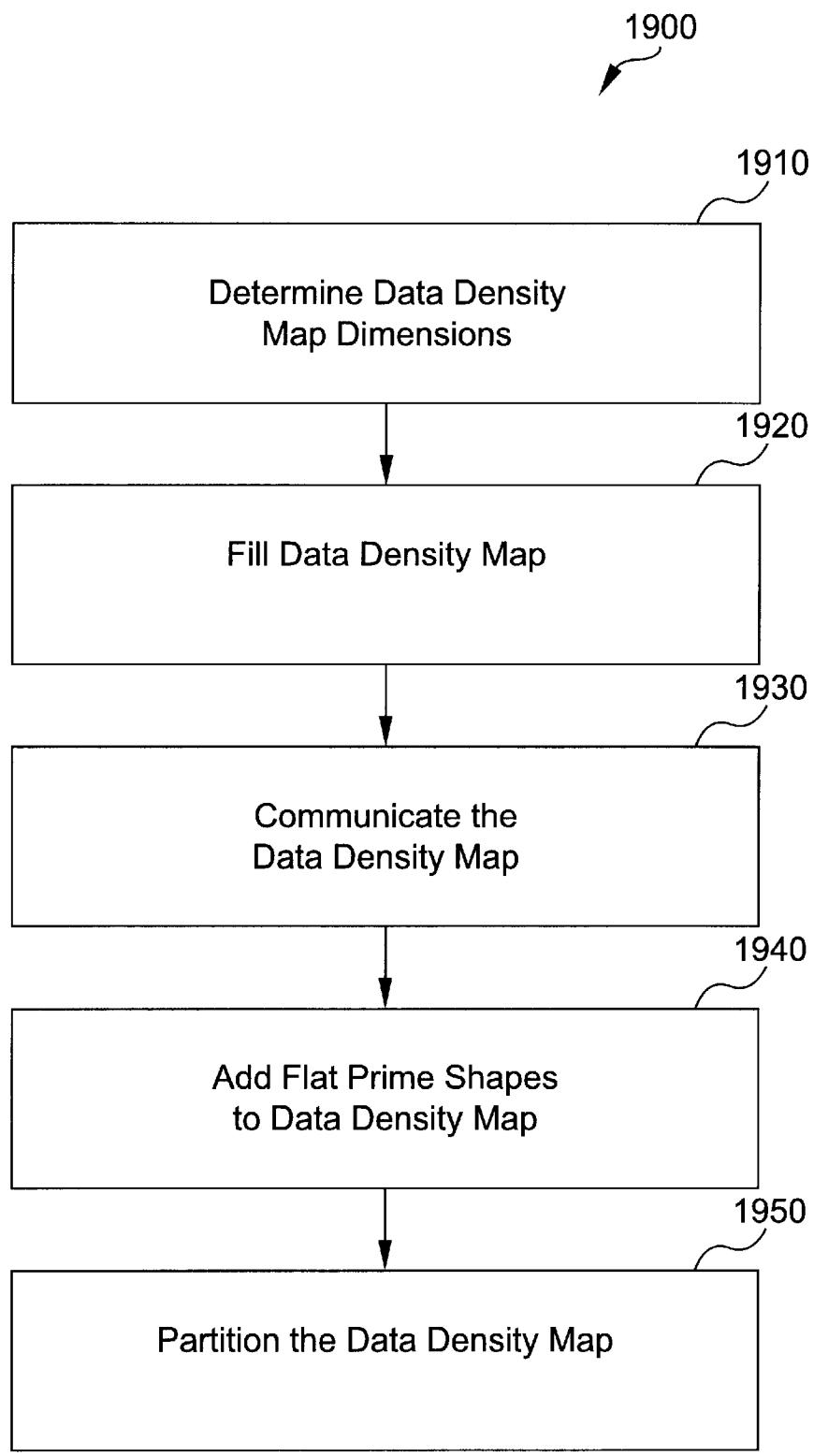
Figure 20:
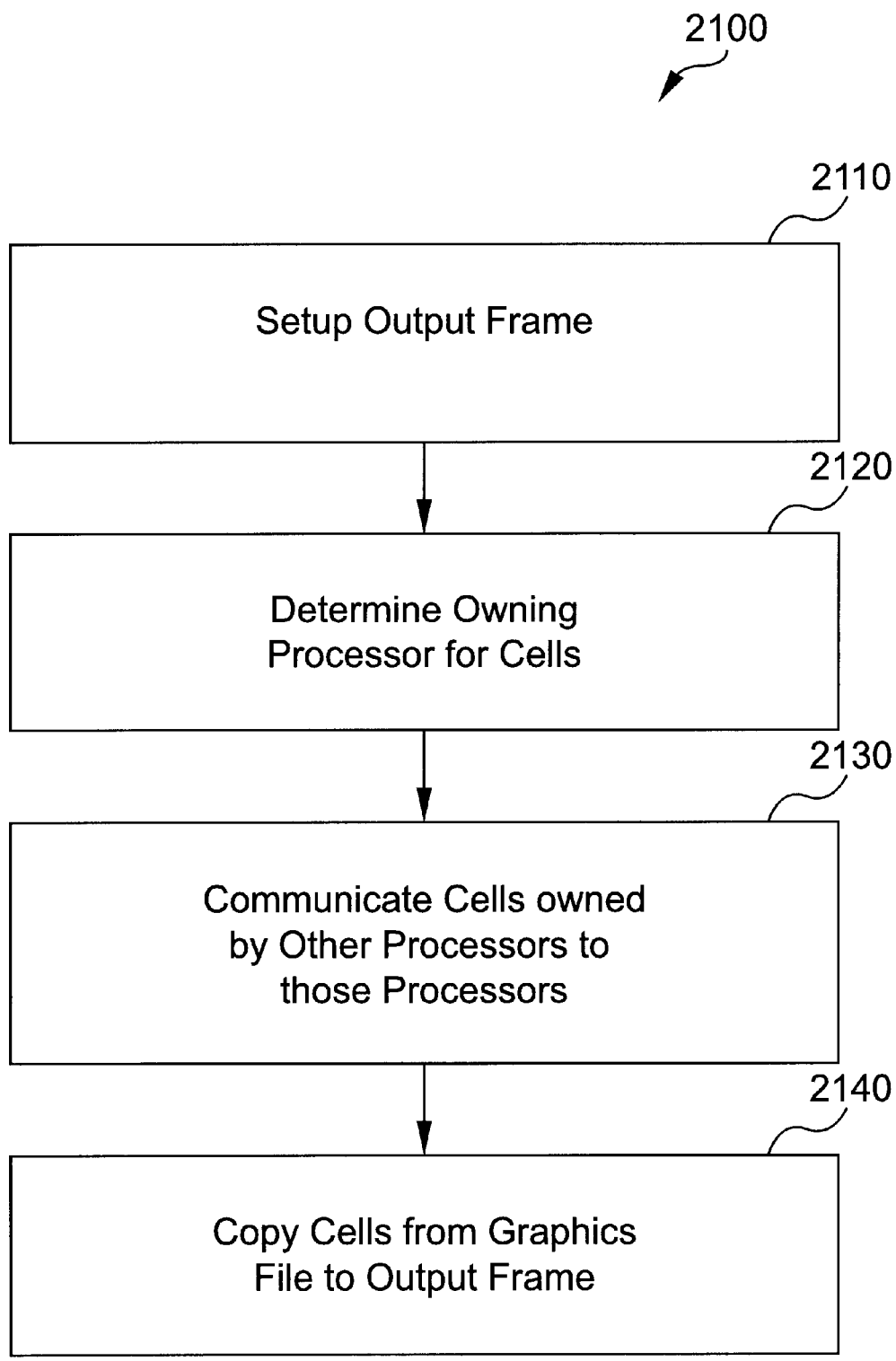

Referring now to FIG. 19 in addition to FIG. 2, FIG. 19 shows a method 1900 for creating and partitioning a data density map, such as data density maps 210, 211. The data density map may be calculated from the bytes contained in each cell in the graphics file 2020 and the space taken by the chip for which the graphics file 2020 represents. In step 1910 of FIG. 19, the data density map's dimensions are determined. The bounding box of the prime cell is already known. From this, one can determine how much physical area the chip will cover. A data density map will preferably be a two-dimensional map wherein each row, column location maps to a grid overlaying the graphics file. The larger the number of rows and columns in a data density map, the better the "granularity" and the finer the partitioning. However, each computer system will be communicating its data density map to the other computer systems. Although this communication is relatively efficient (on the order of log(P), where P is the number of processors or computer systems), there will be more communication. Additionally, more rows and columns will take more operations to compute the data density map and more space. Essentially, the X and Y of the prime cell is divided into "steps" and anything within the X or Y step will be considered placed into a particular row and column.

Figure 15:
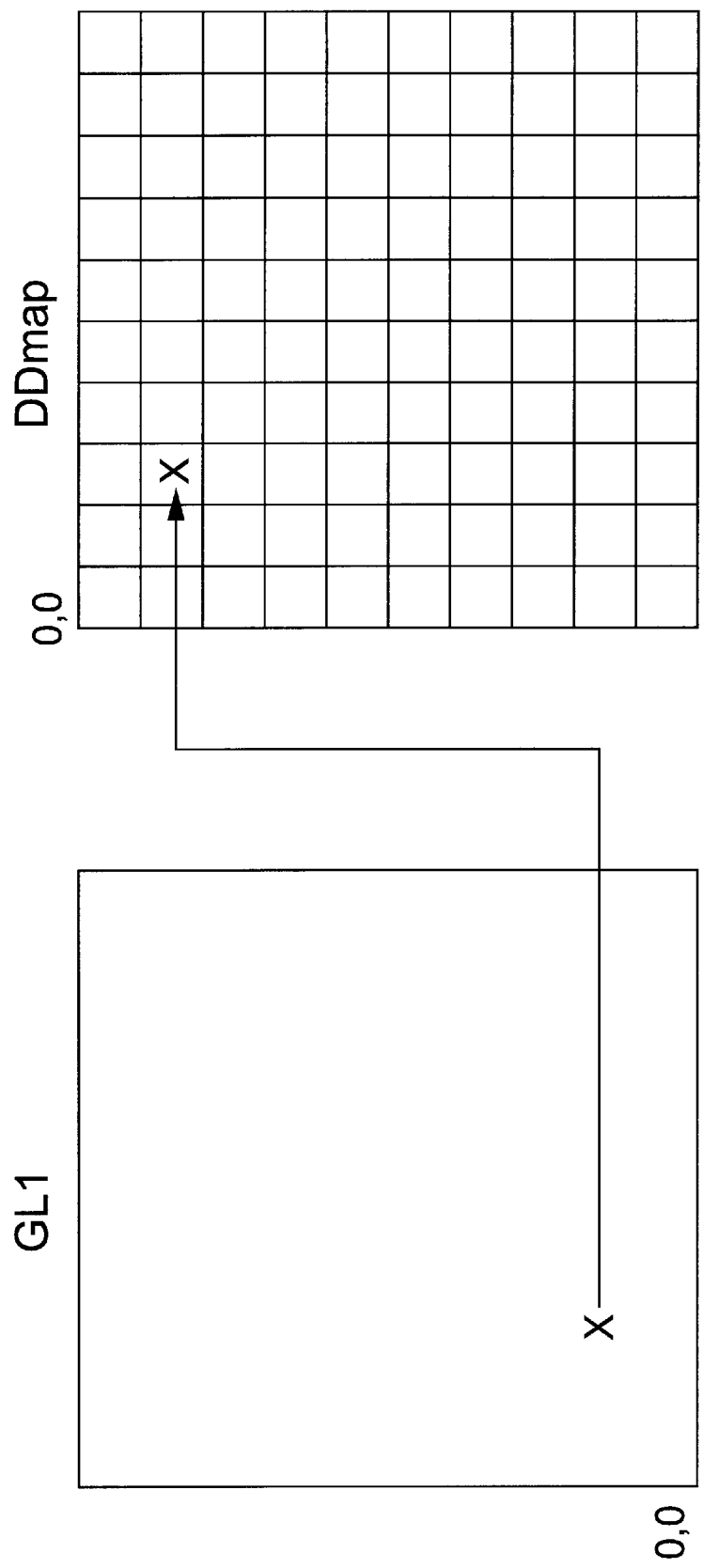
FIG. 15 is a diagram used to illustrate mapping from a graphics file to a data density map.

Turning briefly to FIG. 15, this figure shows the mapping from the graphics file (the GL/1 file in this example) to the data density map. FIG. 15 actually shows the conversion of the X,Y position in each cell of the graphics file to an equivalent row and column location in the data density map. To convert from the current X,Y position to a row, column of the data density map, the following formulas are used. The row of the data density map is calculated by subtracting the minimum Y value of the prime cell from the current Y position. This difference is then divided by the Ystep, which is the number of horizontal GL/1 steps or rows comprising a data density map entry. The column of the data density map is calculated by subtracting the minimum X value of the prime cell from the current X position. This difference is then divided by the Xstep, which is the number of vertical GL/1 steps comprising a data density map entry.

Thus, each X,Y position in a cell will map to a row, column of the data density map. The bounding boxes tell how to map the cell to the data density map: if the bounding box completely maps to one row/column, then the bytes in the entry in the cell table are added to this row/column location; if the bounding box maps to more than one row/column, then the bytes in the entry in the cell table are averaged over the rows/columns and added to the rows/columns. For instance, returning to FIG. 11, Cell 2 has a bounding box of (−1989,13400) in X and (200,7806) in Y. If this bounding box fits into one column and one row, it takes one location and all 10,778 bytes would be added to this one location. If the bounding box fits into two columns and one row, then it fits into two locations and the 10,778 bytes would be divided between these two locations (5389 bytes into each location). If the bounding box fits into two columns and two rows, then it fits into four locations and the 10,778 bytes would be divided between these four locations (2,694.5 or 2,695 rounded bytes into each location).

In FIG. 11, it should be noted that there is no level information. Level information is preferably not kept because the X,Y location of the graphical data described by each cell is used to determine the data density. This is still a three-dimensional calculation, as each cell contains level information and the data density takes into account each cell.

Referring back to FIG. 19 in addition to FIG. 2, in step 1920 of method 1900, the data density map is filled. As previously discussed, a bounding box for each cell has already been calculated. Each computer system will determine how many data density map locations into which the bounding box fits, average the bytes in the cell over these locations, and add this averaged value to each location. Each computer system has its own cell table and its own section of the cell table to examine, as based on the prime transforms assigned to the computer system. Each computer system will end up with a partially filled data density map 210, 211 that corresponds to its particular section of cell table 205, 206.

In 1930 of FIG. 19, the data density map is communicated between computer systems. This is preferably performed through P (where P is the number of computer systems or processors) MPI_Reduce commands. Referring to FIG. 12 in addition to FIG. 19, after communication, each computer system will now have a complete data density map such as that shown in FIG. 12. Comparing this data density map with FIG. 4, the larger numbers of the locations in the data density map compare favorably with the areas in the representation 400. Finer granularity, meaning more rows and columns and therefore locations in the data density map, would create even more similarity.

In step 1940, the "flat" cell prime shapes are added by each computer system to its version of the data density map. The flat prime cell shapes are those shapes that are not described through transforms. These flat prime cell shapes are graphical shapes like polygons, rectangles, and lines. If flat shapes are added to the data density map earlier than this step, there is the possibility of counting this information more than once. Adding the flat shapes in at this time will prevent over-counting these shapes. If desired, additional logic may be added to allow these shaped to be added to the data density map earlier.

In step 1950 of FIG. 19, the data density map is partitioned amongst computer systems. There are many ways of partitioning the data density map amongst computer systems. FIG. 13 illustrates one such preferred method of partitioning. In FIG. 13, a vertical or column partitioning system is used. The vector of FIG. 13 is called a data density ownership vector. Each computer system adds the columns of the data density map (see FIG. 12) and also totals the column totals. The computer system with the lowest taskID will take the number of columns whose sum is approximately equal to the total amount of the data density map divided by the number of computer systems.

In the example of FIG. 12, the data density map has a total value of 997. The computer system with the lowest taskID, which in the example of FIG. 13 is computer system one (taskID "0"), takes the first four columns of the data density map. The first three columns sum to about 25 percent of the 997 total. Therefore, the first computer system will also take the fourth column to make its total approximately equivalent to 997 divided by three (as there are three computer systems in this example). The second and third computer systems ("1" and "2" in taskID references) then take the middle three columns and the last three columns, respectively. This will give the following approximate percentages of data density map for each computer system: 37 percent; 31 percent; and 31 percent, respectively.

FIG. 14 shows a two-dimensional partitioning, both horizontal and vertical, of the data from FIG. 12. Again, each computer system tries to equalize the data density map portions assigned to each computer system. The map of FIG. 14 is called a data density ownership map. In the configuration of FIG. 14, the following approximate percentages of data density map are assigned to each computer system: 35 percent; 31 percent; and 34 percent, respectively. In a two-dimensional system such as shown in FIG. 14, it should be noted that some processing tools for graphics files such as GL/1 files are not able to process certain configurations. For instance, "donuts" will generate errors with some tools. A donut would be created by having one computer system take a "hole" of the data density map and another computer system take the locations surrounding the hole.

Regardless of which method or if other methods are used to partition the data density map, what is important is that the data density map is partitioned relatively evenly between computer systems or processors. This allows each computer system or processor to create a frame that should take approximately the same memory and processing requirements for other frames. This divides the memory and processing requirements amongst many computer systems.

It should be noted that the data density map does not have to be equally divided amongst computer systems. For example, one computer system could take 80 percent of the amount of the data density map and another computer system could take 20 percent of the amount of the data density map. This still allows the data density map and the graphics file to be divided between computer systems.

In the following examples, the data density ownership vector of FIG. 13 will be used, but the data density ownership map of FIG. 14 could also be similarly used. Referring now to FIG. 20 in addition to FIG. 2, FIG. 20 shows a method for creating and outputting an output frame of the graphics file. In step 2110, each computer system sets up its output frame 250, 251. Generally, this involves allocating space for the output frame, writing any necessary header information (such as GL/1 header information), and writing the prime cell flat shapes assigned to this computer system to the output frame.

Figure 17:
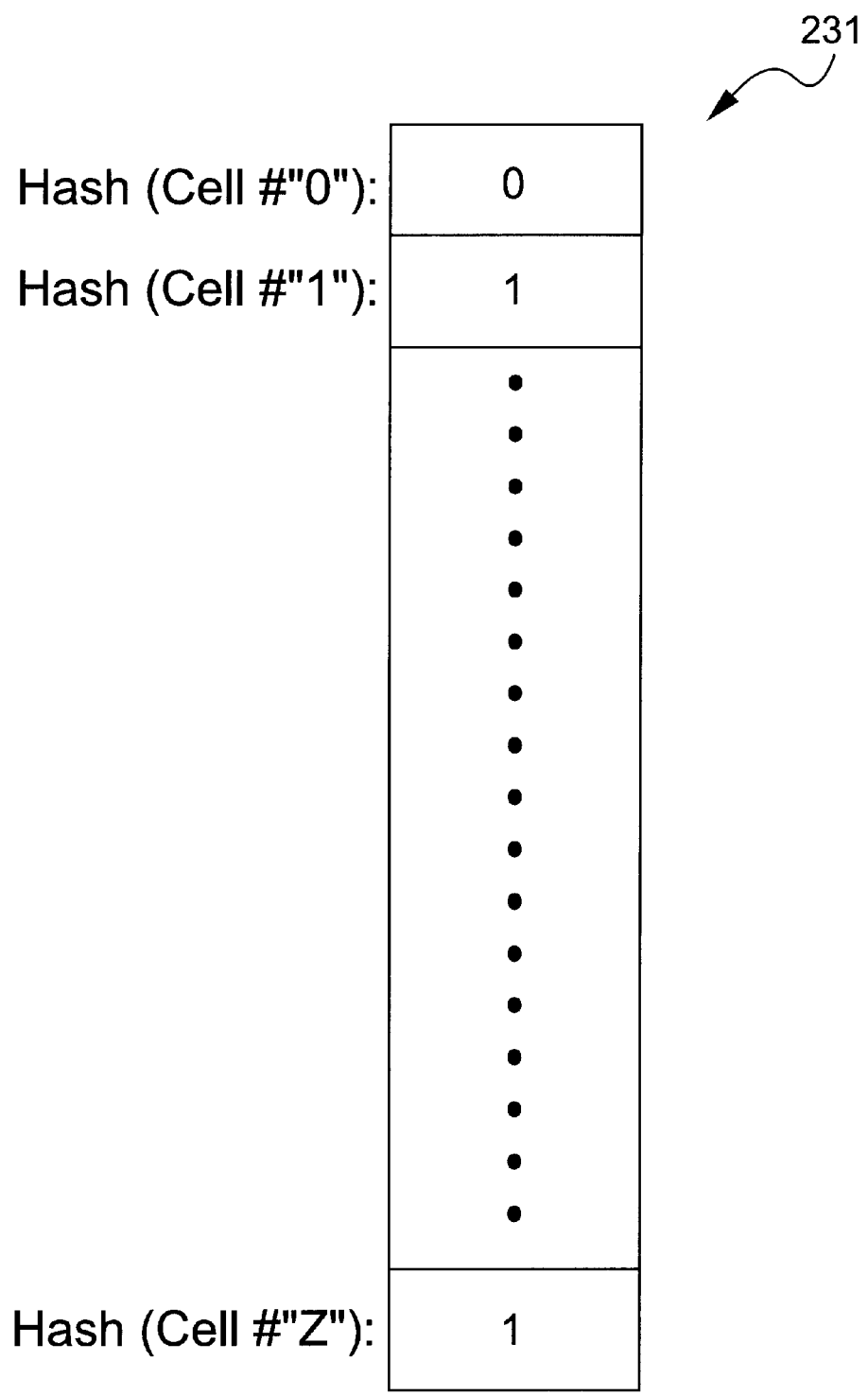
FIG. 17 is an exemplary cell ownership vector in accordance with a preferred embodiment of the present invention.

In step 2120, the computer system determines which processors or computer systems own which cells of the graphics file 2020. Preferably, a depth first traversal algorithm is used for this step. Additionally, the computer system will set up P (where P is the number of processors or computer systems to which the data density map has been allocated) cell ownership vectors. Turning to FIG. 17 in addition to FIGS. 20 and 2, an exemplary cell ownership vector 231 is shown. This cell ownership vector has the same number of entries as there are cells in the graphics file 2020. Each computer system will have P different cell ownership vectors. In the example of FIG. 17, a "1" indicates that this cell is assigned to this particular computer system, while a "0" indicates that this cell is assigned to another computer system.

There are many ways to correlate each entry in the cell ownership vector with a particular cell. The most preferred method to correlate these follows. Preferably, when a computer system creates the initial cell table (such as that shown in FIG. 1), each computer system calls a hash function with as it traverses each cell to create the cell table.

While each cell in the cell table does contain a numbered reference, these references are sometimes not in order. Therefore, it is easier to call a hash function for each cell with the numbered reference for the cell to determine an appropriate number that relates this cell with an entry in the cell table. As is known in the art, a hash function performs a function on a key, mapping it to a unique reference, and returns a number for that key that is based on how many times the hash function has been called. For instance, a hash function might return a zero the first time it is called, a one the second time it is called, etc. As long as each computer system reads the cells of the graphics file in the same order, each computer system's cell table will contain the same hash numbers that correspond to the same cells in the graphics file. Thus, the cell ownership vector 231 of FIG. 17 is referenced through these hash numbers.

As the computer system performs the depth first traversal, it can determine which entry in its cell table relates to a cell in the graphics file because it can determine the hash number for that entry in the cell table and knows the cell number. When a computer system reads an entry in the cell table, it determines which computer system is assigned to this entry. To do this, the computer system examines the bounding box in the entry in the cell table. As discussed previously, the bounding box maps to one or more locations in the data density ownership vector, and the computer system determines which computer system owns the cell to which the bounding box refers. The computer system then marks the appropriate cell ownership vector for these locations.

When the data density ownership vector is used, a computer system can determine which computer system is assigned a cell because each computer system is assigned a range of values on the X axis. For instance, if there are 10 columns in the data density ownership map, 10 computer systems owning each column, and the chip has X axis values of 0 to 99, then each computer system will be assigned 10 values of the X axis. Computer system 1 will have 0 through 9, computer system two will have 10 through 19, etc. Regardless of what the Y axis value for a cell is, if the X axis value overlaps this computer system's range of X axis values, then both computer systems are assigned this cell. When the data density ownership map is used, each computer system will be assigned an area. Thus, the data density ownership vector is easier to use. Note that in both of these instances, the computer systems are assigned a volume because of the levels associated with each cell.

For instance, if processor 2052 determines that it (processor 2052) owns the cell corresponding to hash (cell #Z), it would mark this entry in the cell ownership vector for processor 2052. This is shown in FIG. 17, where the entry in cell ownership vector 231 corresponding to hash (cell #Z) is marked with a "1". Conversely, if processor 2052 determines that processor 2062 (or P in the example of FIG. 2) owns the cell corresponding to hash (cell #Z), processor 2052 would indicate this by entering a "1" value in the entry for cell ownership vector 232 (or P in this example) that corresponds to hash (cell #Z).

It should be noted, as discussed above, to prevent cells from being split during the division process of the graphics file, each computer system preferably will determine if graphical data described by one of its assigned cells (in its assigned volume) leaves its volume and enters the volume belonging to another computer system. If this is the case, this computer system will send the prime transform, which includes the cell whose graphical data crosses the volume boundaries, to the computer system assigned the volume into which the graphical data enters.

For example, briefly returning to FIGS. 4, 5, and 6, FIG. 4 shows an exemplary level of a chip as it would be shown in a display tool. FIG. 5 shows an output frame from computer system one, as the output frame would be shown in a display tool. FIG. 6 shows an output frame from computer system two, as the output frame would be shown in a display tool. Computer system one is assigned partition 491, computer system two is assigned partition 492 and computer system three is assigned partition 493. Note that these partitions are volumes, as each computer system is also assigned additional levels (not shown in these figures). In FIG. 4, the graphical shape 474 leaves partition 491 and enters partition 492 (note that section 440 is essentially section 410 turned 90 degrees counter-clockwise). Because of this, computer system one will inform computer system two of the prime transform that includes section 440 and therefore includes the cell that describes the graphical shape 474. Computer system two thus can mark any cells in its hierarchy tree that are related to this prime transform. Therefore, computer system two outputs section 440 to the output frame so that it does not split the cell that describes graphical shape 474. This is shown in FIG. 6, where section 440 is shown as part of the output frame from computer system two.

Similarly, graphical shape 475 leaves partition 492 and enters partition 491. Computer system two will inform computer system one of the prime transform that includes section 440 and therefore includes the cell that describes the graphical shape 475. With this information, computer system one can output section 450 to avoid splitting the cell that describes graphical shape 475. This is shown in FIG. 5, where section 450 is shown as part of the output frame from computer system one.

Each computer system will thus communicate any prime transforms to other computer systems in order to prevent cells from being broken up. In step 2120, whenever a computer system determines that a cell crosses into another computer system's volume, this computer system will send the prime transform that includes that cell to the other computer system.

At the end of this process in step 2120, each computer system has P cell ownership vectors, each of which is appropriately marked for each computer system's hierarchy tree of the cell table. However, each computer system only really needs the cell ownership vector for itself. Thus, in step 2130, the computer systems communicate the cell ownership vectors to each other. Preferably, this is done through P MPI_Reduce commands. At the end of this process, each computer system will have its cell ownership vector completely filled out. The other P−1 cell ownership vectors will not be complete.

In step 2140, each computer system then uses its cell ownership vector to copy cells from the graphics file 2020 into the output frame. Each output frame will thus contain an amount of information that is proportional to the data density map assigned to this computer system. If each computer system is assigned an equal amount of the data density map, each output frame should contain relatively equal amounts of cell information that should take relatively equal amount of processing time and memory. These frames can then be checked by application(s) 260, 261. Thus, the potentially huge graphics file has been divided into smaller, more manageable blocks of information.

Figure 16:
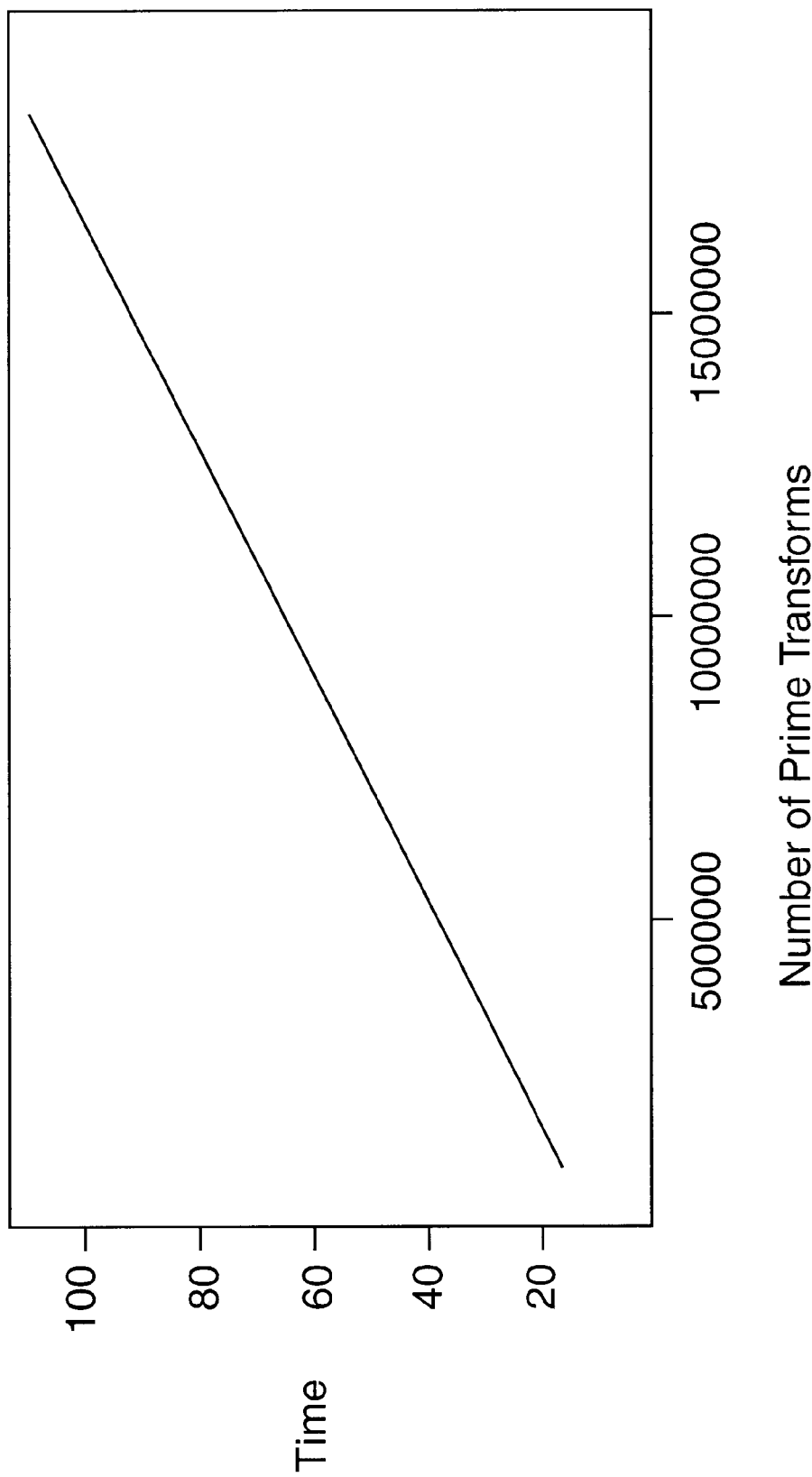
FIG. 16 is a chart used to illustrate benefits of the embodiments of the present invention.

Referring now to FIG. 16, this figure shows a chart of processing time, to create output frames from various graphics files, versus the number of prime transforms when the ParCE mechanism was used on a number of processors. As can be seen by the figure, the time increases linearly as the number of prime cells increases. Thus, the present invention scales well and allows large graphics files to be broken into smaller output frames that can then be more easily handled and processed by relatively small computer systems.

As shown in the previous examples, the preferred embodiments of the present invention describe apparati and methods for dividing large graphics files into smaller output frames of graphics files. The division process is preferably load balanced amongst any number of processors or computer systems. This allows many processors or computer systems to be used in parallel to divide the large graphics file and to then process the smaller frames. Additionally, the load balancing is performed in such a manner that only portions of the graphics file need be loaded by any one processor. This lessens memory and computational requirements for each processor. Preferably, the graphics file is divided in a three-dimensional manner, such that any one processor will be assigned one three-dimensional partition or block of the graphics file. The three-dimensional partition of the graphics file will become one frame, and the processor accesses the graphics file to copy its three-dimensional partition into the new output frame.

While the present invention has been particularly shown and described with reference to preferred embodiments thereof, it will be understood by those skilled in the art that various changes in form and details may be made therein without departing from the spirit and scope of the invention.

It should be noted that methods are not necessarily in the order given, unless an order is necessary.

What is claimed is:

1. An apparatus for partitioning graphical shape data, the apparatus comprising:
    a plurality of processors:
    a memory coupled to the plurality of processors;
    a parallel partitioning mechanism residing in the memory for directing the loading of a graphics file to a second plurality of processors, the parallel partitioning mechanism determining a data density of the graphics file allocated to the plurality of processors and partitioning the graphics file by output frames amongst the second plurality of processors, based on the data density determination; and
    a data density map having a two-dimensional matrix of entries, said matrix organized as columns and rows such that each of said columns intersects one of said rows in one of said entries, each of said entries storing a data density value, the data density map describing the data density of the graphics file, wherein the graphics file comprises a plurality of cells, each cell describing graphical shape data, and wherein the parallel partitioning mechanism determines a chip volume from the cells and maps a plurality of cells of the chip volume to the data density map such that each cell maps to at least one of the entries.

2. The apparatus of claim 1 further comprising a cell table having one entry for each of the plurality of cells, wherein the parallel partitioning mechanism places seek information for each cell in its corresponding entry in the cell table.

3. The apparatus of claim 2 wherein the graphics file further comprises a prime cell having a plurality of prime transforms, each prime transform including a plurality of other cells, wherein the parallel partitioning mechanism partitions the plurality of transforms amongst the second plurality of processors, thereby assigning some of the plurality of prime transforms to each processor.

4. The apparatus of claim 3 wherein the parallel partitioning mechanism determines a bounding box for each of the cells, and wherein the parallel partitioning mechanism, for each cell, places bounding box information for a cell into the entry in the cell table corresponding to this cell.

5. The apparatus of claim 4 wherein the parallel partitioning mechanism uses each of the bounding boxes to determine the chip volume.

6. The apparatus of claim 3 wherein the parallel partitioning mechanism, for each cell, determines a number of bytes in each cell, determines entries in the data density map to which the cell maps, averages the number of bytes over the number of entries in the data density map to which the cell maps, and adds the average to each entry of the data density map to which the cell maps.

7. The apparatus of claim 6 further comprising a data density ownership vector having a plurality of partition entries, each partition entry corresponding to one column of the data density map, wherein the parallel partitioning mechanism partitions the data density map by partitioning the partition entries of the data density ownership vector amongst the plurality of processors, each partition entry having a value that determines which processor is assigned to the column of the data density map.

8. The apparatus of claim 7 wherein the parallel partitioning mechanism partitions the partition entries by determining a column sum for each of the columns of the data density map, determining a total sum for each entry of the data density map, and assigning columns to a processor such that a sum of the column sums for each column assigned to that processor will be about the total sum divided by the number of the processors.

9. The apparatus of claim 3 further comprising a plurality of cell ownership vectors, one for each of the processors such that each cell ownership vector corresponds to only one of the processors, each of the cell ownership vectors comprising one location for each of the cells such that each cell corresponds to only one location, wherein the parallel partitioning mechanism, for each cell, determines which processor or processors is assigned to this cell and places a value, in one or more of the cell ownership vectors for the processor or processors respectively, in a location that corresponds to this cell that indicates that this cell is assigned to a processor.

10. The apparatus of claim 9 wherein the parallel partitioning mechanism uses the cell ownership vector for one or the processors to copy cells to the output frame.

11. The apparatus of claim 1 further comprising an application residing in the memory, wherein the application processes the output frame.

12. The apparatus of claim 11 wherein the application is selected from the group consisting of a design rule checking application, a fill application, and a cheese application.

13. An apparatus for partitioning and load balancing graphical shape data among computer systems interconnected through a network, the apparatus comprising:

a graphics file comprising a plurality of cells and a prime cell having a plurality of prime transforms, each of the prime transforms including a plurality of cells;

one parallel partitioning mechanism residing on each of a plurality of computers in the network, each of the plurality of computers comprising a data density map having a two-dimensional matrix of entries, said matrix organized as columns and rows such that each of said columns intersects one of said rows in one of said entries, each of said entries storing a data density value, a cell table having one entry of the plurality of cells in the graphics file, and an output frame, wherein the parallel partitioning mechanism for each computer system:

determines a chip volume;

divides the chip volume into a plurality of block and maps each of the blocks to one of the entries in data density map;

partitions the data density map amongst the plurality of computer systems, thereby assigning each computer system a computer system of the chip volume, wherein each computer system volume is approximately the same; and copies a portion of the cells from the graphics file to an output frame, wherein the portion corresponds to one of the computer system volumes.

14. The apparatus of claim 13 wherein each parallel partitioning mechanism:

partitions the plurality of prime transforms amongst the plurality of computer systems such that each computer system is assigned some of the prime transforms and each computer system thereby is assigned cells included by the prime transforms assigned to it;

for each computer system:

determines a cell volume for each of the cells assigned to this computer system and placing the cell volume for each cell in the cell table that corresponds to this cell; and determines an initial computer system volume from the entries in the cell table; and determines the chip volume from the initial computer system volumes by communicating the initial computer system volumes between computer systems.

15. The apparatus of claim 14 wherein each of the plurality of computer systems comprises a plurality of cell ownership vector, one for each of the computer systems such that each cell ownership vector corresponds to only each of the computer systems, each of the cell ownership vectors comprising one location for each of the cells such that each cell corresponds to only one location, wherein each parallel partitioning mechanism, for each cell included by the prime transforms assigned to the computer system:

determines to which computer system volume or volumes the cell volume maps;

places a value in a location that corresponds to this cell, the value being placed in the cell ownership vector or vectors that correspond to the computer system volume or volumes, respectively.

16. The apparatus or claim 15 wherein the plurality of parallel partitioning mechanisms communicate such that each computer system contains a correct version of the cell ownership vector that corresponds to it such that each parallel partitioning mechanism will have some of the cells assigned to it.

17. The apparatus of claim 15 wherein, on each of the plurality of computers, each parallel partitioning mechanism uses its own cell ownership vector to copy cells assigned to it to the output frame for this computer.

18. The apparatus of claim 13 wherein each of the plurality of computer systems further comprises a data density of ownership vector having a plurality of partition entries, each partition entry corresponding to one column of the data density map, wherein each parallel partitioning mechanism for each computer system partitions the data density map by partitioning the partition entries of the data density ownership vector amongst the plurality of computer systems, each partition entry having a value that determines which processor is assigned to which column of the density map.

19. The apparatus of claim 18 wherein each parallel partitioning mechanism for each of the plurality of computers partitions the partition entries by determining a column sum for each of the columns of the data density map, determining a total sum for each entry of the data map, and assigning columns to a computer system such that a sum of the column sums for each column assigned to that computer system will be about the total sum divided by the number of the computer systems.

20. The apparatus of claim 13 further comprising an application on one of the plurality of computer systems, wherein the application processes the output frame on the one computer system.

21. A method for partitioning graphical shape data, the method comprising the steps of:

providing a graphics file;

distributing the graphics file amongst a plurality of computer;

determining a data density of the graphics file resident on the plurality of computers;

partitioning the data density amongst a second plurality of processors, thereby assigning part of the graphics file to each processor: and for each processor, copying the part of the graphics file assigned to the processor to an output frame, wherein the graphics file comprises a plurality of cells, wherein each of plurality of cells describes graphical shape data occupying a cell volume, and wherein the step of determining a data density of the graphics file comprises the steps of:
   determining a chip volume into which each graphical shape data for each cell would fit; and
   mapping this chip volume into a data density map comprising a two-dimensional matrix of entries, said matrix organized as columns and rows such that each of said columns intersects one of said rows in one of said entries, each of said entries storing a data density value.

22. The method of claim 21 further comprising the step of executing an application that processes the output frame.

23. The method of claim 21 wherein the graphics file comprises a plurality of cells, wherein each of plurality of cells describes graphical shape data, wherein the graphics file further comprises a prime cell comprising a plurality of prime transforms, and wherein the step of determining a data density of the graphics file further comprising the steps of:
   dividing the plurality of prime transforms amongst the plurality of processors, thereby assigning some of the prime transforms to each processor; and
   performing the following steps for each processor:
      creating a cell table having one entry for each of the cells, each entry comprising a seek location for the cell corresponding to the entry;
      for each prime transform assigned to eaeh processor, determining cells included by each prime transform, determining an amount of data in each cell included by each prime transform, and determining a cell volume into which each graphical shape data for each cell would fit.

24. The method of claim 23 wherein the step of distributing the graphics file amongst a plurality of processors comprises the step of dividing a chip volume between the processors, thereby assigning each processor a processor volume, wherein the step of copying the part of the graphic file assigned to the processor to an output frame comprises the step of, for each entry in the cell table:
   determining which entries in the cell table are assigned to the processor by determining if the cell volume for a cell overlaps the processor volume assigned to this processor; and
   if the cell volume for a cell coincides with the processor volume assigned to this processor, copying contents of this cell to the output frame.

25. The method of claim 21 wherein the chip volume comprises a two-dimensional area into which each graphical shape data for each cell would fit.

26. The method of claim 21 wherein the step of determining a data density of the graphics file further comprises, for each cell, the steps of:
   determining a number of bytes in each cell;
   determining entries in the data density map to which the cell maps;
   averaging the number of bytes over the number of entries in the data density map to which the cell maps; and
   adding the average to each entry of the data density map to which the cell maps.

27. The method of claim 21 wherein the step of determining a chip volume into which each graphical shape data for each cell would fit comprise the steps of:
   for each cell, determining a cell volume into which each graphical shape data for each cell the cell volumes for all the cells would fit; and
   determining maximum X, maximum Y, minimum X, and minimum Y values into which each of the cell volumes for all the cells would fit.

28. The method of claim 21 wherein each processor is part of one of a plurality of computer systems.

29. The method of claim 28 wherein one of the computer systems comprises more than one processor.

30. A method for partitioning and load balancing graphical shape data, the method comprising the steps of:
   providing a graphics file apportioned amongst a plurality of processors comprising a plurality of cells;
   mapping each of the cells to at least one of a plurality of entries in a two-dimensional matrix of said entries in a density map, said matrix organized as columns and rows such that each of said columns intersects one of said rows in one of said entries, each of said entries storing a data density value;
   performing the following steps, for each cell, to fill the plurality of entries in the data density map;
   determining a number of bytes in each cell;
   determining entries in the data density map to which the cell maps;
   averaging the number of bytes over the number of entries in the data density map to which the cell maps; and
   adding the average to each entry of the data density map to which the cell maps;
   partitioning the data density map amongst a second plurality of processors such that each processor is assigned a relatively even amount of the data density map; and
   performing the following steps for each of the partitions of the data density map:
      creating and initializing an output frame; and
      performing the following steps for each cell of the graphics file:
         determining if this cell is assigned to this partition; and
         if this cell is assigned to this partition, copying contents of this cell to the output frame.

31. The method of claim 30 further comprising the step of executing an application that processes the output frame.

32. The method of claim 30 wherein the graphics file further comprises a prime cell comprising a plurality of prime transforms, and wherein performing the following steps, for each cell, to fill the plurality of entries in the data density map further comprises the steps of:
   dividing the plurality of prime transforms amongst the plurality of processors, thereby assigning some of the prime transforms to each processor; and
   creating a cell table having one entry for each of the cells, each entry comprising a seek location for the cell corresponding to the entry.

33. The method of claim 30 wherein the step of partitioning the data density map amongst a second plurality of processors comprises the steps of:
   summing each entry in the data density map to create a total sum;
   summing each column in the data density map to create a plurality of column sums; and for each processor assigning to this processor a number of columns such that a processor sum of the column sums is approximately equal to the total sum divided by the number of processors.

34. A program product, tangibly embodying a program of machine-readable instructions executable by a computer system, the program product comprising:
   a parallel partitioning program determining a data density of a graphics file apportioned to plurality of processors and partitioning the graphics file amongst a second plurality of processors, thereby assigning part of the graphics file to each processor, and wherein the parallel partitioning program copies a part of the graphics file assigned to one of the processors to an output frame; and signal bearing media bearing the parallel partitioning program, wherein the parallel partitioning program creates a data density map having a two-dimensional matrix of entries, said matrix organized as columns and rows such that each of said columns intersects one of said rows in one of said entries, each of said entries storing a data density value, the data density map describing the data density of the graphics file, wherein the graphics file comprises a plurality of cells, each cell describing graphical shape data, and wherein the parallel partitioning program determines a chip volume from the cells and maps a plurality of blocks of the chip volume to the data density map such that each block maps to one of the entries.

35. The program product of claim 34 wherein the signal bearing media comprises transmission media.

36. The program product of claim 34 wherein the signal bearing media comprises recordable media.

37. The program product of claim 34 wherein the parallel partitioning program creates a cell table having one entry for each of the plurality of cells, wherein the parallel partitioning program places seek information for each cell in its corresponding entry in the cell table.

38. The program product of claim 37 wherein the graphics file further comprises a prime cell having a plurality of prime transforms, each prime transform including a plurality of other cells, wherein the parallel partitioning program partitions the plurality of transforms amongst the second plurality of processors, thereby assigning some of the plurality of prime transforms to each processor.

39. The program product of claim 38 wherein the parallel partitioning program determines a bounding box for each of the cells, and wherein the parallel partitioning program, for each cell, places the bounding box information for a cell into the entry in the cell table corresponding to this cell.

40. The program product of claim 39 wherein the parallel partitioning program uses each of the bounding boxes to determine the chip volume.

41. The program product of claim 38 wherein the parallel partitioning program, for each cell: determines a number of bytes in each cell, determines entries in the data density map to which the cell maps, averages the number of bytes over the number of entries in the data density map to which the cell maps, and adds the average to each entry of the data density map to which the cell maps.

42. The program product of claim 41 wherein the parallel partitioning program creates a data density ownership vector having a plurality of partition entries, each partition entry corresponding to one column of the data density map, wherein the parallel partitioning program partitions the data density map by partitioning the partition entries of the data density ownership vector amongst the second plurality of processors, each partition entry having a value that determines which processor is assigned to the column of the data density map.

43. The program product of claim 42 wherein the parallel partitioning program partitions the partition entries by determining a column sum for each of the columns of the data density map, determining a total sum for each entry of the data density map, and assigning columns to a processor such that a sum of the column sums for each column assigned to that processor will be about the total sum divided by the number of the processors.

44. The program product of claim 38 wherein the parallel partitioning program creates a plurality of cell ownership vectors, one for each of the processors such that each cell ownership vector corresponds to only one of the processors, each of the cell ownership vectors comprising one location for each of the cells such that each cell corresponds to only one location, wherein the parallel partitioning program, for each cell, determines which processor or processors is assigned to this cell and places a value, in one or more of the cell ownership vectors for the processor or processors respectively, in a location that corresponds to this cell that indicates that this cell is assigned to a processor.

45. A program product for partitioning and load balancing graphical shape data among computer systems interconnected through a network and connected to a graphics file comprising a plurality of cells and a prime cell having a plurality of prime transforms, each of the prime transforms including a plurality of cells, the program product tangibly embodying a program of machine-readable instructions executable by a computer system, the program product comprising:

one parallel partitioning mechanism able to be distributed to each of a plurality of computers in the network, each parallel partitioning mechanism thereby creating a data density map having a two-dimensional matrix of entries, said matrix organized as columns and rows such that each of said columns intersects one of said rows in one of said entries, each of said entries storing a data density value, a cell table having one entry for each of the plurality of cells in the graphics file, and an output frame, wherein the parallel partitioning mechanism for each computer system:

determines a chip volume;

divides the chip volume into a plurality of blocks and maps each of the blocks to one of the entries in the data density map;

partitions the data density map amongst a second plurality of computer systems, thereby assigning each computer system a computer system volume of the chip volume, wherein each computer system volume is approximately the same; and copies a portion of the cells from the graphics file to an output frame, wherein the portion corresponds to one of the computer system volumes; and signal bearing media bearing the parallel partitioning program.

46. The program product of claim 45 wherein the signal bearing media comprises transmission media.

47. The program product of claim 45 wherein the signal bearing media comprises recordable media.

48. The program product of claim 45 wherein each parallel partitioning program:

partitions the plurality of prime transforms amongst the second plurality of computer systems such that each computer system is assigned some of the prime transforms and each computer system thereby is assigned cells included by the prime tgransforms assigned to it; for each computer system:

determines a cell volume for each of the cells assigned to this computer system and places the cell volume for each cell in the entry in the cell table that corresponds to this cell; and determines an initial computer system volume from the entries in the cell table; and determines the chip volume from the initial computer system volumes by; communicating the initial computer system volumes between computer systems.

49. The program product of claim 48 wherein each of the parallel partitioning mechanisms creates a plurality of cell ownership vectors, one for each of the computer systems such that each cell ownership vector corresponds to only one of the computer systems, each of the cell ownership vectors comprising one location for each of the cells such that each cell corresponds to only one location, wherein each parallel partitioning program, for each cell included by the prime transforms assigned to the computer system:

determines to which computer system volume or volumes the cell volume maps;

places a value in a location that corresponds to this cell, the value being placed in the cell ownership vector or vectors that correspond to the computer system volume or volumes, respectively.

50. The program product of claim 49 wherein the plurality of parallel partitioning programs communicate such that each computer system contains a correct version of the cell ownership vector that corresponds to it such that each parallel partitioning program will have some of the cells assigned to it.

51. The program product of claim 49 wherein, on each of the plurality of computers, each parallel partitioning program uses its own cell ownership vector to copy cells assigned to it to the output frame for this computer.

52. The program product of claim 45 wherein each parallel partitioning programs creates a data density ownership vector having a plurality of partition entries, each partition entry corresponding to one column of the data density map, wherein each parallel partitioning program for each computer system partitions the data density map by partitioning the partition entries f the data density ownership vector amongst the second plurality of computer systems, each partition entry having a value that determines which processor is assigned to which column of the data density map.

53. The program product of claim 52 wherein each parallel partitioning program for each of the plurality of computers partitions the partition entries by determining a column sum for each of the columns of the data density map, determining a total sum for each entry of the data density map, and assigning columns to a computer system such that a sum of the column sums for each column assigned to that computer system will be about the total sum divided by the number of the computer systems.

* * * * *

UNITED STATES PATENT AND TRADEMARK OFFICE
CERTIFICATE OF CORRECTION

PATENT NO. : 6,788,302 B1
DATED : September 7, 2004
INVENTOR(S) : Ditlow et al.

It is certified that error appears in the above-identified patent and that said Letters Patent is hereby corrected as shown below:

Column 7,
Line 34, delete "Processors 10" and insert -- Processors 110 --

Column 19,
Line 37, delete "FIG. 1" and insert -- FIG. 11 --

Column 24,
Line 6, delete "vector" and insert -- vectors --
Line 8, delete "only each of" and insert -- only one of --

Column 25,
Lines 63 and 64, delete "cell the cell volumes for all the cells would fit" and insert -- cell would fit --

Column 30,
Line 9, delete "entries f the" and insert -- entries of the --

Signed and Sealed this

Twenty-third Day of November, 2004

JON W. DUDAS
*Director of the United States Patent and Trademark Office*